(12) United States Patent  (10) Patent No.: US 6,720,965 B1
Hirosawa et al.  (45) Date of Patent: Apr. 13, 2004

(54) IMAGE DISPLAY DEVICE

(75) Inventors: Masashi Hirosawa, Tenri (JP); Masafumi Yamanoue, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/857,398
(22) PCT Filed: Nov. 25, 1999
(86) PCT No.: PCT/JP99/06561
§ 371 (c)(1), (2), (4) Date: May 31, 2001
(87) PCT Pub. No.: WO00/33289
PCT Pub. Date: Jun. 8, 2000

(30) Foreign Application Priority Data

Nov. 30, 1998 (JP) .......................... 10/336654

(51) Int. Cl.$^7$ ............................................. G06T 15/00
(52) U.S. Cl. ...................................................... 345/423
(58) Field of Search ................. 345/468, 469, 345/469.1, 467; 715/517, 518, 519, 520, 525

(56) References Cited

U.S. PATENT DOCUMENTS

| 4,903,311 | A | * | 2/1990 | Nakamura .................. 382/174 |
|---|---|---|---|---|
| 4,939,670 | A | * | 7/1990 | Freiman et al. ............. 358/1.11 |
| 5,111,514 | A | * | 5/1992 | Ohta ........................... 382/177 |
| 5,383,730 | A | * | 1/1995 | Takahashi ....................... 400/76 |
| 5,802,532 | A | * | 9/1998 | Nakayama et al. .......... 715/519 |
| 5,949,906 | A | * | 9/1999 | Hontani et al. .............. 382/177 |
| 6,289,123 | B1 | * | 9/2001 | Xiaomang et al. ........... 382/181 |

FOREIGN PATENT DOCUMENTS

| EP | 0822711 A2 | 2/1998 |
|---|---|---|
| JP | 62-229289 | 10/1987 |
| JP | 03078020 A | 4/1991 |
| JP | 05328097 A | 12/1993 |
| JP | 06309468 A | 11/1994 |
| JP | 09016713 A | 1/1997 |
| JP | 10-51701 | 2/1998 |
| JP | 10193735 A | 7/1998 |
| JP | 10207887 A | 8/1998 |

* cited by examiner

Primary Examiner—Phu K. Nguyen
(74) Attorney, Agent, or Firm—David G. Conlin; Richard J. Roos; Edwards & Angell, LLP

(57) ABSTRACT

An image display device allowing viewing of zoomed images with good operability includes a divided line region extracting portion (2) for dividing a line region included in an input image in a line direction, and extracting a plurality of divided line regions; and a processing portion (4, 5) connected to the divided line region extracting portion (2) for zooming in or out, arranging and displaying the divided line regions at a predetermined zoom rate in units each formed of the extracted divided line region while keeping a sequence of arrangement.

10 Claims, 31 Drawing Sheets

| | 24 | 20 | 21 | 22 | 23 |
|---|---|---|---|---|---|
| rect[0] | | left[0] | top[0] | width[0] | height[0] |
| rect[1] | | left[1] | top[1] | width[1] | height[1] |
| rect[2] | | left[2] | top[2] | width[2] | height[2] |
| ⋮ | | ⋮ | ⋮ | ⋮ | ⋮ |
| rect[n-1] | | left[n-1] | top[n-1] | width[n-1] | height[n-1] |

IMAGE DISPLAY DEVICE

TECHNICAL FIELD

The present invention relates to an image display device, and more particularly, to an image display device displaying, on an enlarged or reduced scale, document images containing characters, pictures or photographs, or the like.

BACKGROUND ART

Simply enlarging or reducing an image in its entirety has been generally known as a technique for displaying a document image containing pictures, photographs or the like in an enlarged or reduced scale with a display device. A technique is also generally known and is employed in a word processor or a WWW (Word Wide Web) browser wherein the number of characters per line is changed depending on a size of a display screen or print sheet, and characters and pictures are rearranged for displaying or printing.

Further, in connection with document images formed of image data, a method has been known for distinguishing and extracting character regions in the document image from non-character regions, as is disclosed in Japanese Patent Laying-Open No. 9-16713. Another method is also known for extracting regions of main body or text from image data, and arranging the extracted main body regions in units each formed of a line or a block, as is disclosed in Japanese Patent Laying-Open No. 5-328097.

When one reads pages of a book, characters may be excessively small and difficult to read. If a method of simply enlarging the whole image is employed in the above case, the enlarged or reduced image may be larger than the display screen so that some characters may fall out of a display screen.

For viewing the undisplayed portion, a scroll bar may be arranged in an image display device for manipulation. However, manipulation for vertically or horizontally moving the image is required, resulting in low operability.

For zooming in or out (i.e., enlarging or reducing) only a required portion in the image, it is necessary to specify a rate of zooming in or out (which will be referred to as a "zoom rate", hereinafter) every time the zooming is required. Further, the zoom rate must be changed in accordance with every change in page layout of the page of the book. This impairs the operability.

If a vertically or horizontally long image is zoomed out to display the whole image within the display screen, regions not displaying the image are formed vertically or horizontally in the display screen. This prevents effective use of the display screen, and reduces an amount of information displayed on the screen.

According to the method disclosed in Japanese Patent Laying-Open No. 5-328097, since rearrangement is performed in units each formed of a line or a block, the number of characters per line cannot be set to an arbitrary value. If the picture or photograph regions are present together with the character regions in a mixed fashion, it is impossible to display both kinds of regions in appropriate sizes.

DISCLOSURE OF INVENTION

Accordingly, an object of the invention is to provide an image display device that can display a zoomed (i.e., enlarged or reduced) image with good operability.

Another object of the invention is to provide an image display device that can zoom in or out an input image while keeping a large amount of information displayed on each output image.

Yet another object of the invention is to provide an image display device that can zoom in or out picture or photograph regions as well as character regions at appropriate zoom rates even if these regions are mixedly present in a single input image.

Further another object of the invention is to provide an image display device that can display a page number and others to be located in a peripheral region of an input image in appropriate positions on an output image prepared by enlarging an input image.

According to an aspect of the invention, an image display device includes a divided line region extracting portion for dividing a line region included in an input image in a line direction, and extracting a plurality of divided line regions, and a processing portion connected to the divided line region extracting portion for zooming in or out, arranging and displaying the divided line regions at a predetermined zoom rate in units each formed of the extracted divided line region while keeping a sequence of arrangement.

Since zooming is performed in units each formed of the divided line region prepared by dividing the line region of the input image, text can be zoomed in or out without disturbing a sequence of characters in the input image. By appropriately determining a length of one side of the output image, therefore, a user can read the text only moving the output image only in one direction so that the user can easily view the document image. Since the rearrangement is performed for each divided line region, an amount of information which can be displayed on each output image can be larger than that on an output image prepared by merely enlarging the input image.

Preferably, when the divided line regions cannot be displayed in an output image of a predetermined size, the processing portion prepares a new output image for arranging the divided line region thereon.

When the divided line region cannot be displayed in a single output image, they are output as a plurality of continuous output images. The output image has the predetermined size. Therefore, the user can successively view the displayed contents by switching output images, resulting in improved operability.

More preferably, the image display device includes a picture region detecting portion for detecting a picture region and a photograph region in the input image, and a picture zoom rate calculating portion connected to the picture region detecting portion for determining a new zoom rate in relation to the predetermined zoom rate for zooming the picture and photograph regions detected by the picture region detecting portion so as to prevent increase in size over the output image. The divided line region extracting portion is connected to the picture region detecting portion for extracting as the divided line regions the picture region and the photograph region detected by the picture region detecting portion. The processing portion includes a picture zooming and displaying portion connected to the divided line region extracting portion and the picture zoom rate calculating portion for zooming in or out, and arranging the picture region and the photograph region based on the new zoom rate for display on the output image, and a character zooming and displaying portion connected to the divided line region extracting portion for zooming in or out, and arranging the divided line region other than the picture region and the photograph region based on the predetermined zoom rate for display on the output image.

When the picture region and the photograph region are zoomed in or out, the zoom rate of the picture region and the photograph region is determined to prevent increase in size over the output image. This zoom rate is different from that of the character portion. Therefore, the user can view the picture and photograph regions and the text which are appropriately zoomed in or out without extending off the screen.

More preferably, the image display device further includes a picture region detecting portion for detecting the picture region and the photograph region in the input image, and an output image size calculating portion connected to the picture region detecting portion for comparing a size of the picture region or the photograph region detected by the picture region detecting portion and zoomed in or out at the predetermined zoom rate with a size of the output image, and selecting the larger size as a new output image size. The processing portion further includes a picture zooming and displaying portion connected to the region detecting portion, the divided line region extracting portion and the output image size calculating portion for zooming in or out, and arranging the picture region and the photograph region based on the predetermined zoom rate for display in a position on the output image determined based on the new output image size, and a character zooming and displaying portion connected to the region detecting portion, the divided line region extracting portion and the output image size calculating portion for zooming in or out, and arranging the picture region and the photograph region based on the predetermined zoom rate for display in a position on the output image determined based on the original output image size.

The size of the output image is determined depending on the sizes of the picture region and the photograph region which are zoomed in or out. Therefore, a user can freely designate the zoom rates of the picture region and the photograph region. Further, the size of the original output image may be determined to be equal to that of the display region, whereby the scrolling in only one direction is required for reading the text.

More preferably, the image display device further includes a body peripheral region detecting portion connected to the divided line region extracting portion for detecting, as a body peripheral region, the divided line region located on an end of the input image among the divided line regions. The processing portion is connected to the body peripheral portion detecting portion and the divided line region extracting portion for arranging and displaying the body peripheral region while keeping the same relative positional relationship as that on the input image.

This can avoid such a disadvantage that the body peripheral region and the other regions are zoomed in or out without distinguishing them from each other, and thereby a page number and others are displayed in unexpected positions.

An image display device according to another aspect of the invention includes a body region extracting portion for extracting a body region other than an end of each of a plurality of input images, a zoom rate calculating portion connected to the body region extracting portion for calculating a zoom rate for each of the plurality of input images such that the enlarged body region has the same size as the input image, a common zoom rate determining portion connected to the zoom rate calculating portion for determining a common zoom rate based on the output of the zoom rate calculating portion, and a processing portion connected to the body region extracting portion and the common zoom rate determining portion for enlarging and displaying the body region of each of the plurality of input images at the common zoom rate.

The zoom rate common to the input images is determined. Therefore, characters of a substantially uniform size can be displayed on the different output images, and a user can read the text without a sense of incompatibility.

BRIEF DESCRIPTION OF DRAWINGS

FIG. 8 shows an example of division of each line of the image in FIG. 4 based on a division number;

FIG. 9 shows an example of division of each line of the image in FIG. 4 based on a reference width;

FIG. 10 shows an example of extraction of character regions from each line in the image shown in FIG. 4;

FIGS. 21, 22 and 23 show output images produced from results of processing in FIGS. 8, 9 and 8, respectively;

FIG. 24 shows a problem caused by merely zooming in or out an input image;

BEST MODE FOR CARRYING OUT THE INVENTION

First Embodiment

Figure 1:
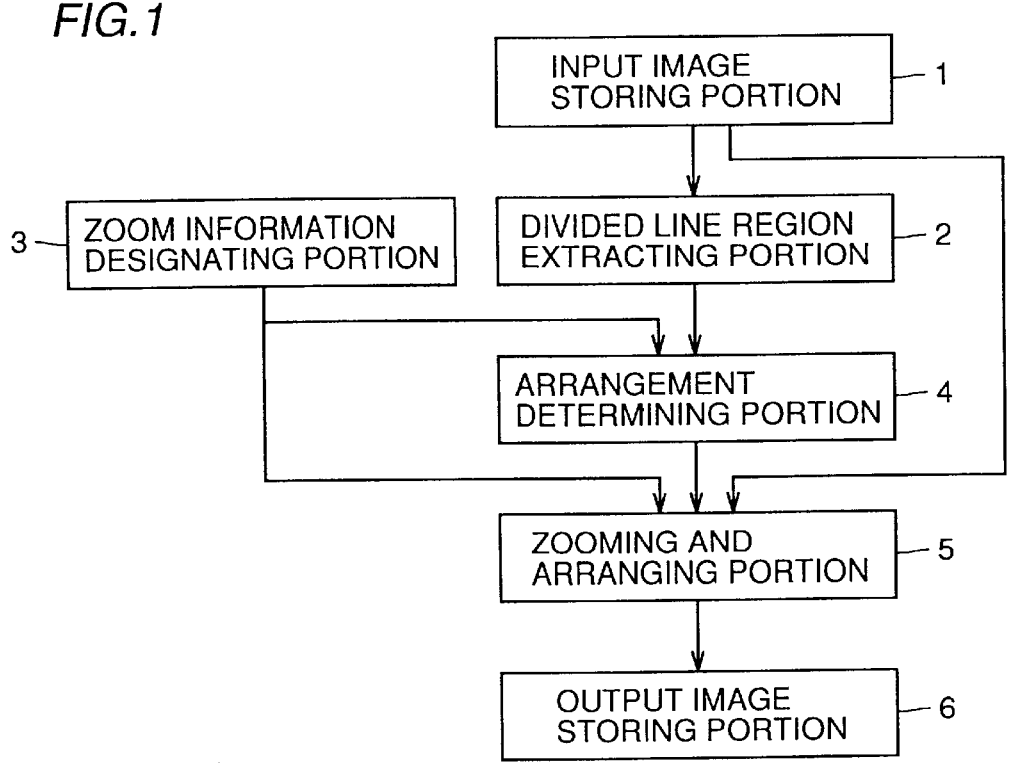
FIG. 1 is a block diagram showing a major structure of an image display device according to a first embodiment of the invention.

Referring to FIG. 1, an image display device according to a first embodiment of the invention includes an input image storing portion 1, which is formed of an IC memory, a magnetic memory or the like for storing an input image, a divided line region extracting portion 2 which is connected to input image storing portion 1 for processing the input image stored in input image storing portion 1 on a page-by-page basis, extracting a plurality of line regions from each page, dividing each line region and extracting a plurality of divided line regions, and a zoom information designating portion 3 designating a zoom rate for displaying the divided line region as well as a size of an output image.

The image display device further includes an arrangement determining portion 4 which is connected to divided line region extracting portion 2 and zoom information designating portion 3 for calculating positions of the respective divided line regions rearranged on the output image based on information of the divided line regions sent from divided line region extracting portion 2 as well as the zoom rate and the output image size issued from zoom information designating portion 3, a zooming and arranging portion 5 which is connected to input image storing portion 1, zoom information designating portion 3 and arrangement determining portion 4 for cutting out the divided line regions from the input image stored in input image storing portion 1, and arranging the divided line regions on the output image after zooming them, and an output image storing portion 6, which is connected to zooming and arranging portion 5, for storing the output of zooming and arranging portion 5.

Owing to the above structures, the input images are processed on a page-by-page basis, and are stored as output images in output image storing portion 6.

Input image storing portion 1 may include a scanner, a video capture board, a communication port or the like.

The input images stored in input image storing portion 1 are document images formed of image data, which is prepared by reading, e.g., by a scanner, respective pages of a book such as a novel or a comic book, and the image data is stored in an appropriate sequence on a page-by-page basis. In addition to a page-by-page basis, the image data may be stored in units each formed of, e.g., a double spread or a column. In the following description, it is assumed that the image data is stored on the page-by-page basis (i.e., in units each formed of a page).

Zoom information designating portion 3 has stored the zoom rate and the output image size, which are determined in advance, and designates the zoom rate and the output image size based on the stored rate and size. Zoom information designating portion 3 calculates and designates the zoom rate and output image size in a predetermined manner. Further, zoom information designating portion 3 designates the zoom rate and image size based on an input by a user.

Figure 2:
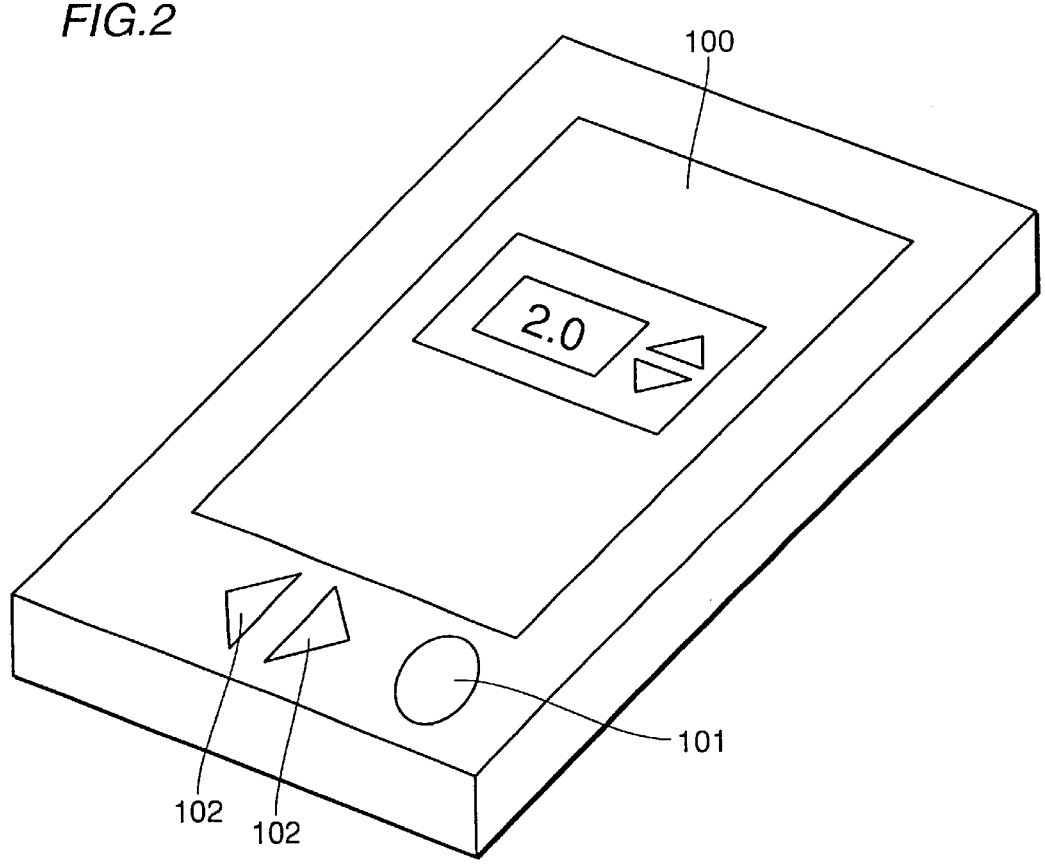
FIG. 2 shows an outer appearance of the image display device according to the first embodiment of the invention.

Referring to FIG. 2, the image display device further includes a display screen 100 which is formed of a CRT (Cathode-Ray Tube), an LCD (Liquid Crystal Display) panel or the like, and can perform the bit mapped display of the input image stored in input image storing portion 1 or the output image stored in output image storing portion 6, a button 101 for instructing switching of display between the input image stored in input image storing portion 1 and the output image stored in output image storing portion 6, and a button 102 for turning a page. When the input image is being displayed on display screen 100, a user can successively change the displayed input images page by page by touching button 102. When the output image is being displayed on display screen 100, the user can successively change the displayed output images page by page by touching button 102.

Zoom information designating portion 3, which provides soft-buttons for specifying a zoom rate, is formed on display screen 100 using a GUI (Graphical User Interface). The zoom rate in zoom information designating portion 3 may be entered via a keyboard or a button, or by voice. For example, it may be configured such that the zoom rate changes in predetermined increments when a hard- or soft-button is touched. Zooming and arranging portion 5 may change the output image in real time in accordance with increase or decrease in zoom rate. Thereby, the user can visually and easily recognize the zoom rate.

The size of output image can be changed arbitrarily in accordance with the zoom rate designated by zoom information designating portion 3. In the following description, however, it is assumed that the displayed output image has the same size as the input image, unless otherwise specified. For scrolling the image displayed on display screen 100, a jog-dial (not shown) or the like may be employed in the image display device.

Figure 3:
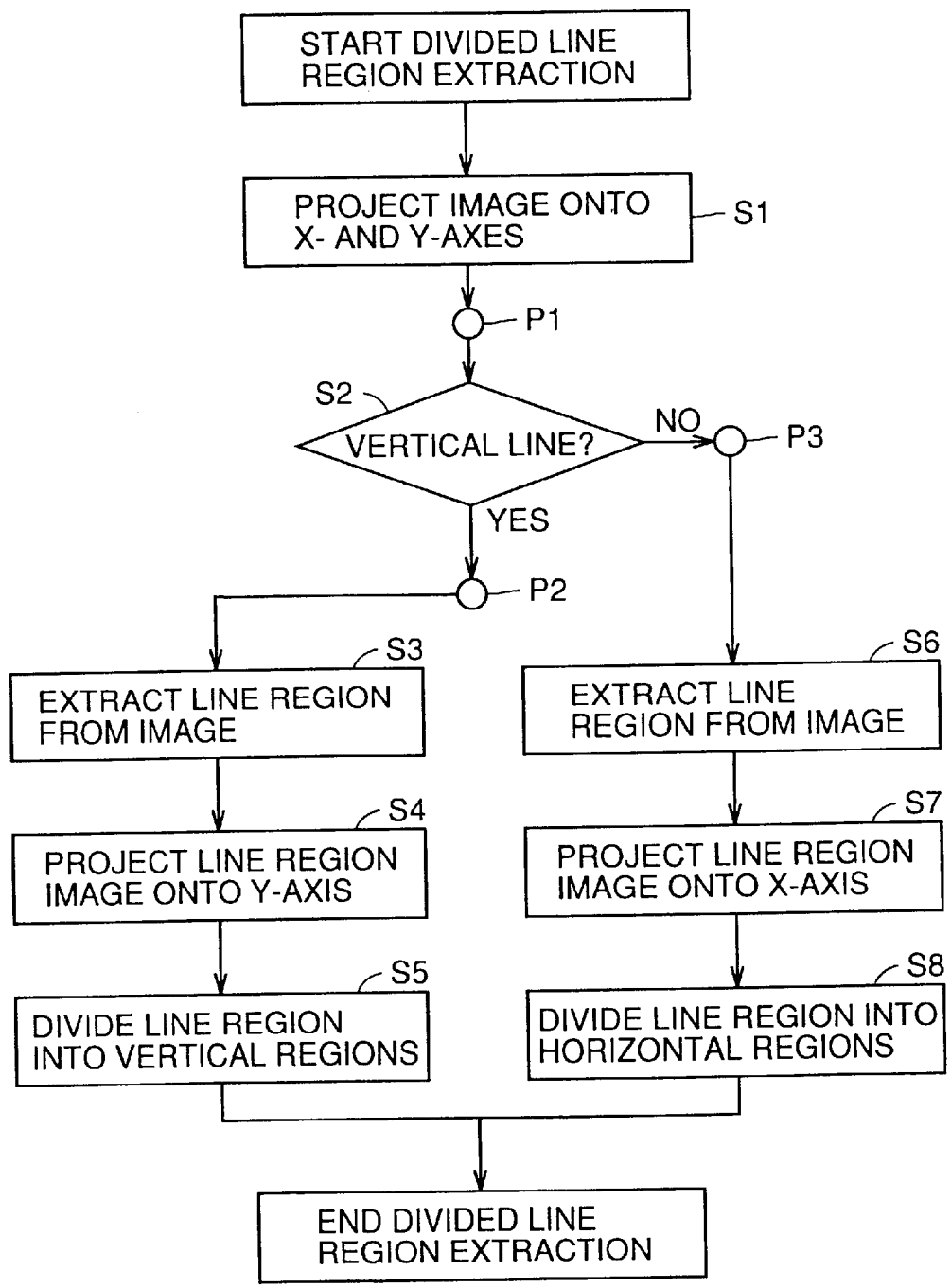
FIG. 3 is a flowchart showing an operation of a divided line region extracting portion 2 in FIG. 1.

Referring to FIG. 3, divided line region extracting portion 2 operates as follows. Divided line region extracting portion 2 projects a density onto vertical and horizontal axes (step S1).

Figure 4:
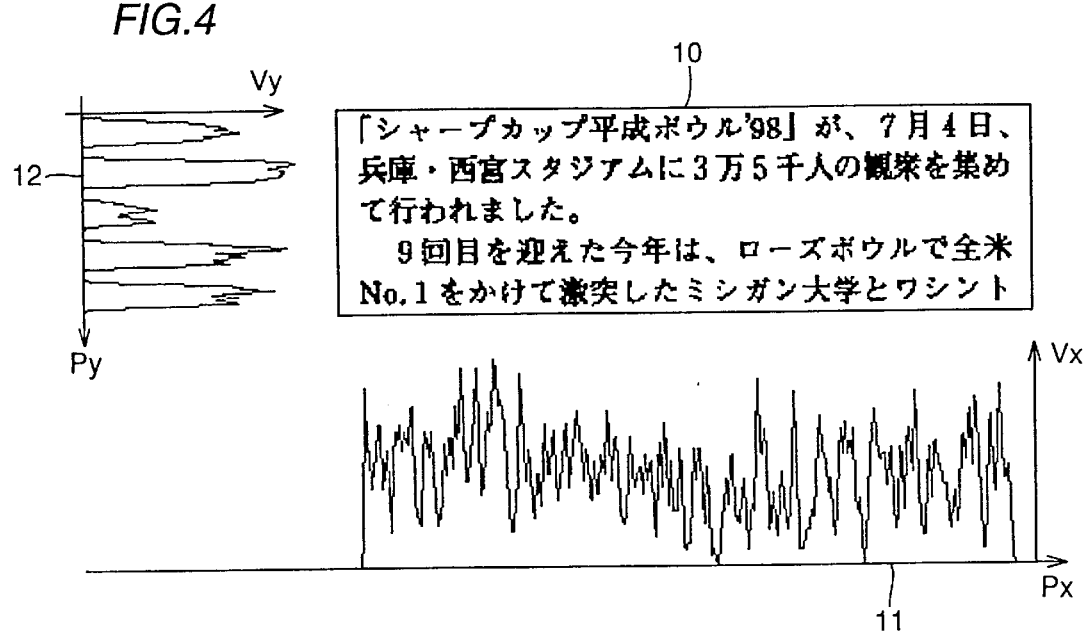
FIG. 4 shows results of projection of an image onto vertical and horizontal axes.

Referring to FIG. 4, a line graph 11 is drawn by projecting the density value of input image 10 onto the horizontal axis (which will also be referred to as the "x-axis", hereinafter), and a line graph 12 is drawn by projection onto the vertical axis (which will also be referred to as the "y-axis", hereinafter). In the figure, the right direction in graph 11 corresponds to a Px axis representing a projection position, and the upward direction in graph 11 corresponds to a Vx axis representing a projection value. Likewise, a downward direction in graph 12 corresponds to a Py axis representing a projection position, and an upward direction in graph 12 corresponds to a Vy axis representing a projection value. The projection value corresponds to the number of black pixels if the input image is a binary image, and corresponds to a sum of density values if the input image is a multilevel image. For easy understanding, graph 12 and input image 10 are aligned in FIG. 4 so that the projection values of projection results may be plotted in the same positions on the x-axis as the projected pixels of input image 10, respectively. In graph 11, the projection values of projection results are likewise plotted in the same positions on the x-axis as the projected pixels of input image 10, respectively. If the projection result of each position is represented as an integer of 16 bits, the whole projection results are arranged within an array of the same size as the image width using the 16-bit values as components.

Referring to FIG. 3 again, divided line region extracting portion 2 determines whether the character line in the input image is vertical or not (step S2). If it is determined that the character line is horizontal (NO in step S2), divided line region extracting portion 2 divides the input image into a plurality of lines, and extracts a plurality of line regions (step S6). Divided line region extracting portion 2 projects each line region onto the horizontal axis (step S7). Divided line region extracting portion 2 divides each line region into a plurality of regions, and extracts the plurality of divided line regions (step S8).

If it is determined that the character lines in the input image are vertical (YES in step S2), the rows and columns are interchanged, and processing similar to that in steps S6–S8 is performed to extract the plurality of divided line regions (steps S3–S5). Therefore, specific description of the processing in steps S3–S5 is not repeated here.

Figure 5:
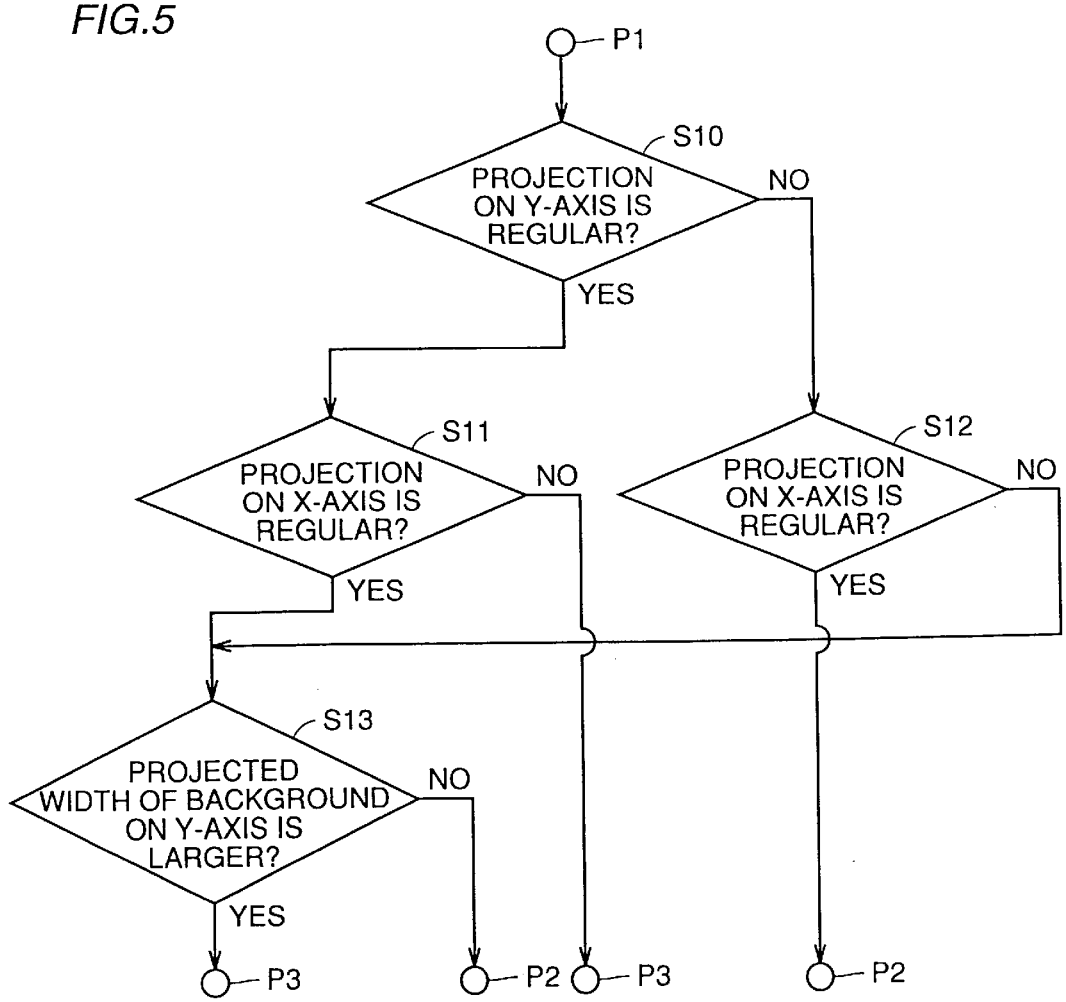
FIG. 5 is a flowchart for determining whether character lines are vertical or not.

Referring to FIG. 5, processing in step S2 shown in FIG. 3 will now be described in greater detail. Divided line region extracting portion 2 determines whether a result of projection onto the vertical axis is regular or not (step S10). Various techniques may be employed for this determination of regularity. For example, frequency analysis is performed on the projection result, and it is determined whether sharp peaks are present at specific frequencies or not. In this example, the projection result is simply changed into a binary form based on a threshold. For example, this produces a string of "0, 0, 1, 0, 0, 0, 1, 1, 1, 0, 0, 0, 1, 1, 1, 0, 0, 0, 1, 1, 1, 0, 0". Run lengths of the runs of "0" and run lengths of the runs of "1" are determined for checking a frequency distribution of the run lengths. In the above example, the runs of "0" exhibit such a distribution that the frequency of run length of "3" is 3, and the frequency of run length of "2" is 2. The runs of "1" exhibit such a relationship that the frequency of run length of "1" is 1, and the frequency of run length of "3" is 3. If the frequency of the run length larger than threshold T1 is larger than threshold T2, it is determined that the regularity is present. Assuming that T1 is equal to 2, and T2 is equal to 2, the above example satisfies the foregoing conditions, and therefore it is determined that the regularity is present because the frequency of the run length of "1" and the frequency of run length of "0" are both equal to 3.

If it is determined that the projection onto the vertical axis provides a regular result (YES in step S10), the processing moves to a step S11. If it is determined that the projection onto the vertical axis provides an irregular result (NO in step S10), the processing moves to a step S12.

In step S11, it is determined whether the projection onto the horizontal axis provides a regular result or not. If the projection onto the horizontal axis provides a regular result (YES in step S11), the processing moves to a step S13. If the projection onto the horizontal axis does not provide a regular result (NO in step S11), it is determined that the character line in the input image is horizontal, and the processing moves to a connector P3. A manner similar to that in step S10 is performed for determining whether the projection onto the horizontal axis provides a regular result or not. Therefore, a detailed description thereof is not repeated here.

In a step S13, comparison is performed between a width of a background obtained by the projection onto the vertical axis and that obtained by the projection onto the horizontal axis. According to the example of the runs already described, the above comparison corresponds to comparison of the run lengths of the runs "0" corresponding to the background. The runs of "0" may provide two or more different run lengths, each of which is larger than threshold T1, and appear at the frequency larger than threshold T2. In this case, the run length of the largest frequency is selected as the subject of comparison. In the above example, the above conditions are satisfied by the runs of "0" which provide the run length of 3 at the frequency of "3" as well as the runs of "0" which provide the run lengths of 2 at the frequency of 2. Among these run lengths, the runs providing the run length of 3 at the frequency of 3 are selected as the comparison subject. The run length of runs of "0" obtained from the projection onto the vertical axis are compared with the run length of run of "0" obtained from the projection onto the horizontal axis, and the larger run length is determined that the background have a larger width. If the width of the background obtained by the vertical axis projection is larger than the width of the background obtained by the horizontal axis projection (YES in step S13), it is determined that the character line on the input image is horizontal, and the processing moves to connector P3. If the width of the background obtained by the vertical axis projection is not larger than the width of the background obtained by the horizontal axis (NO in step S13), it is determined that the character line on the input image is vertical, and the processing moves to a connector P2.

In step S12, it is determined whether projection of the input image onto the horizontal axis provides a regular result or not. The manner for this determination is similar to that in step S1. Accordingly, a detailed description thereof is not repeated here. When it is determined that the projection of the input image onto the horizontal axis provides a regular result (YES in step S12), it is determined that the character line on the input image is vertical, and the processing moves to connector P2. When it is determined that the projection of the input image onto the horizontal axis provides an irregular result (NO in step S12), the processing moves to step S13.

Figures 6, 7:
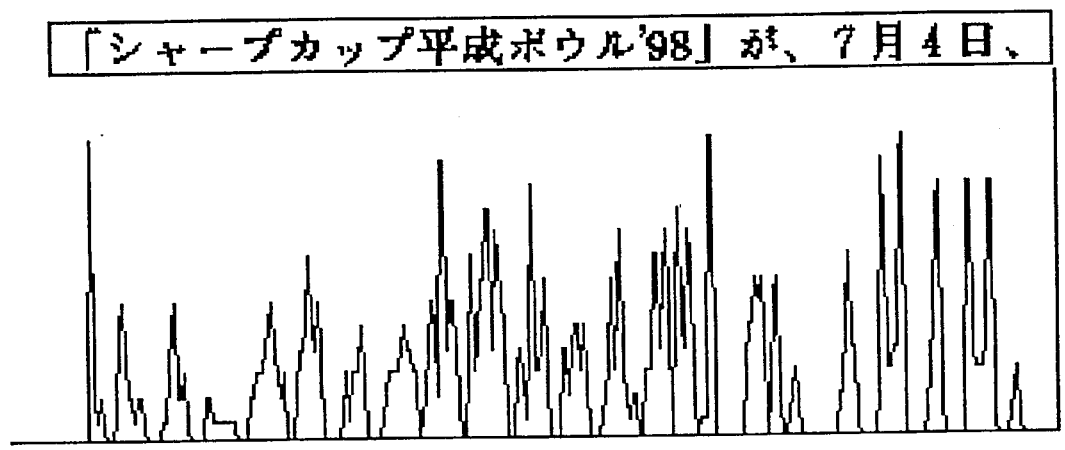
FIG. 6 shows an image of an uppermost horizontal line in FIG. 4 and a result of projection thereof onto a horizontal axis.
FIG. 7 schematically shows a manner of storing information relating to a rectangle.

In step S6 shown in FIG. 3, divided line region extracting portion 2 extracts regions of horizontal lines from the input image because it is determined that the character line on the input image is not vertical in step S2. Referring to FIG. 6, divided line region extracting portion 2 first extracts the uppermost horizontal line in FIG. 4. In the example of the runs already described, portions including the runs of "1" of which run length exceeds threshold T3 are extracted as lines. The portion determined as the line is cut out in a horizontal form as indicated by a rectangular region in FIG. 6, and thereby the line region is extracted. Actually, this can be sufficiently achieved by merely obtaining coordinate information of a rectangle corresponding to the line region, i.e., the coordinates (left, top) of the upper left corner and the information (width, height) of the width and height of the rectangle.

Referring to FIG. 7, description will be given on the coordinate information of the rectangles, which are stored in a memory (not shown) when lines of n in number are extracted in step S6. Coordinate values (left[0], top[0]) of a first rectangle rect[0] are stored in cells 20 and 21, respectively. Information (width[0], height[0]) relating to the width and height of rectangle rect[0] are stored in cells 22 and 23, respectively. Each cell is formed of 2 bytes. The address value of top[0] of rect[0] can be obtained by adding 2 bytes to the address value of left[0]. Likewise, the address of width[0] and height[0] can be obtained by adding 4 bytes and 6 bytes to the address of left[0], respectively. An address of a rectangle rect[1] on the second line (i.e., address of a cell 24) is represented as ((address of rect[0])+8). In this manner, rectangle information on each line can be accessed.

In a step S7, each rectangle (line region) is projected onto the horizontal axis using the rectangle information obtained in step S6. A line graph shown in FIG. 6 is obtained by the projection of the line region in the first line.

In step S8, the line region is divided into a plurality of regions based on the rectangle information obtained in step S6 and the projection results obtained in step S7. If the number into which the region is to be divided is predetermined, the width of the line region in the line direction is divided by this division number for obtaining the average size of the divided line regions. Divided line region extracting portion 2 divides the line region by the average size for obtaining a provisional division position. Divided line region extracting portion 2 changes the results of projection onto the horizontal axis, which are obtained in step S7, into a binary form, and the position of the density of 0 nearest to the provisional division position is determined as the division position. In practice, such a manner may not be employed that the line region is completely divided in the division positions for obtaining the divided line regions. Alternatively, it may be assumed that no character is present in portions of the density of 0, and such portions may not be deemed as the divided line region. Likewise, the portion at the end of the line region may not be deemed as the divided line region if its density is 0. As a height of the divided line region, the height of the line region is used as it is.

Each line on the image in FIG. 4 is divided into two divided line regions so that regions shown in FIG. 8 are formed. For easy understanding, each divided line region on the image is surrounded by a solid line square. A background region (i.e., region of the density of 0) is present between the last character at the left divided line region in the first line and the first character at the right divided line region following it. This region is not included in the divided line region. Accordingly, the left and right divided line regions are not in contact with each other. Since the first portion of the fourth line is indented by one character, the space formed by the indent is not included in the divided line region. By removing the portions of the density of 0 as described above, the divided line region may have a width of 0, in which case the region of 0 in width may be eliminated from the divided line region. For example, only one divided line region is present in the third line. This is because the right divided line region has a width of 0 as a result of elimination of the portion of density of 0. For this reason, the divided line region in the third line is one in number.

In the foregoing example shown in FIG. 8, the line region is divided based on the division number. Alternatively, a reference width of the divided line region may be determined in advance, and the line region may be divided in the position closest to the position achieving this reference width.

An example of the division based on the reference width is shown in FIG. 9. In this example, the reference width is substantially equal to that of two characters, and for this purpose, the reference width is equal to double the height of the divided line region.

Without determining the division number and the reference width, only the minimum width of the run of the density equal to 1 may be determined in advance, and the region in which the run length of the run of 1 is equal to or larger than the minimum width may be extracted. In this case, the region in which the run length of the run of 1 is smaller than the minimum width may be ignored as noises, or may be merged with a neighboring divided line region.

By predetermining the division number of each line, such an advantage can be achieved that zooming and arranging portion 5 can enlarge the input image by a factor of an integer, or can reduce the input image into a fraction of an integer by simple processing. For example, when the division number is 2 and the zoom rate is 2, calculation for rearrangement can be simple.

If the reference width or the minimum width is determined in advance, this can be effective at removal of noises and others. If the reference width or the minimum width is determined in advance nearly to an integral submultiple of the width of the output image, the output image can be utilized more effectively when rearranging it for display.

When the character region is extracted, and the extracted character region is divided into divided line regions, these are formed as shown in FIG. 10. An example of extracting the character regions will now be described. For example, if the density value of the background is smaller than that of the character portion, divided line region extracting portion 2 changes the input image into the binary form, and performs the labeling for extracting the regions of coupled black pixels. Divided line region extracting portion 2 acquires the outer-contact rectangles of the coupled regions of the black pixels. Information of the one coupled region is expressed by the labeling value as well as the coordinates of the upper left position of the outer-contact rectangle and the size thereof. The result of processing by divided line region extracting portion 2 is formed of the number of coupled regions and the information of each coupled region, and is stored in the memory. If the outer-contact rectangle has an area not exceeding a threshold Ta, this rectangle is deemed as noises, and is eliminated from the following processing.

Figure 11:
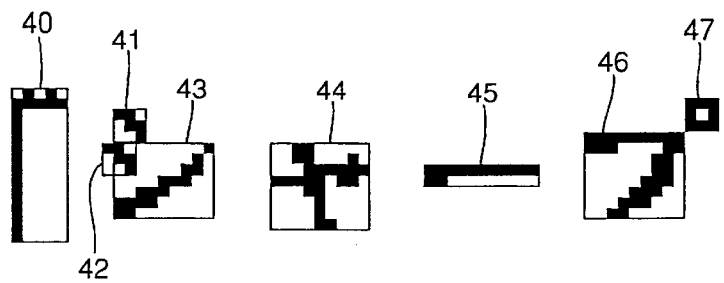
FIG. 11 shows outer-contact rectangular regions before merging.

FIG. 11 shows the outer-contact rectangles obtained for the respective coupled regions. For easy understanding, FIG. 11 shows outer-contact rectangular regions 40–47 together with the characters. A distance between the outer-contact rectangles is determined. The outer-contact rectangles, which is spaced by the distance not exceeding a threshold Td, are deemed as portions of the same character region, and are merged with each other. It is assumed that a range on a rectangle u in the x-axis direction is defined between u1 and u2 (u1≦u2), and a range of a rectangle v in the x-axis direction is defined between v1 and v2 (v1≦v2). In the case of u1<u2≦v1≦v2, the distance is equal to (v1−u2). In the case of v1≦u2≦v2 or u1≦v2≦u2, the distance is equal to 0. In the case of v1≦v2≦u1≦u2, the distance is equal to (u1−v2). In a similar manner, the distance in the y-axis direction is obtained, and smaller one between the distances in the x-axis and y-axis directions is selected as the distance between the outer-contact rectangles.

The merging of the outer-contact rectangles means such an operation that all the labeling values of the plurality of coupled regions to be merged are unified to one of them, and the outer-contact rectangular region is determined again. The pixel(s) having the labeling value other than the unified labeling value are searched on the image, and are replaced with the unified labeling value. If the results of processing are stored in the foregoing manner, divided line region extracting portion 2 substitutes the position and size of the new outer-contact rectangle into the labeling information including the unified value so that the unified labeling information is erased. Further, the number of coupled regions is reduced by one.

Figure 12:
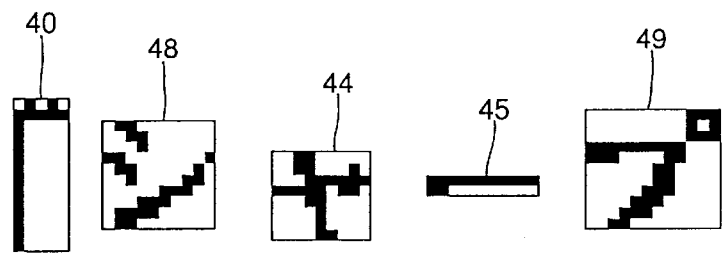
FIG. 12 shows outer-contact rectangular regions after merging.

The foregoing merging processing is repeated until the outer-contact rectangle to be merged is no longer present. Through the series of processing described above, the character regions are extracted. Referring to FIG. 12, outer-contact rectangle regions 41–43 are merged into a character region 48, and outer-contact rectangle regions 46–47 in FIG. 11 are merged into a character region 49.

The character regions thus obtained are handled as the divided line regions. Instead of the above manner, the divided line regions may be extracted by gathering the character regions based on the division number or reference width of the line region. Also, the divided line regions may be extracted by gathering the character regions into regions each including a predetermined number of characters. Further, the divided line regions may be extracted based on the distances between the outer-contact rectangles.

Figure 13:
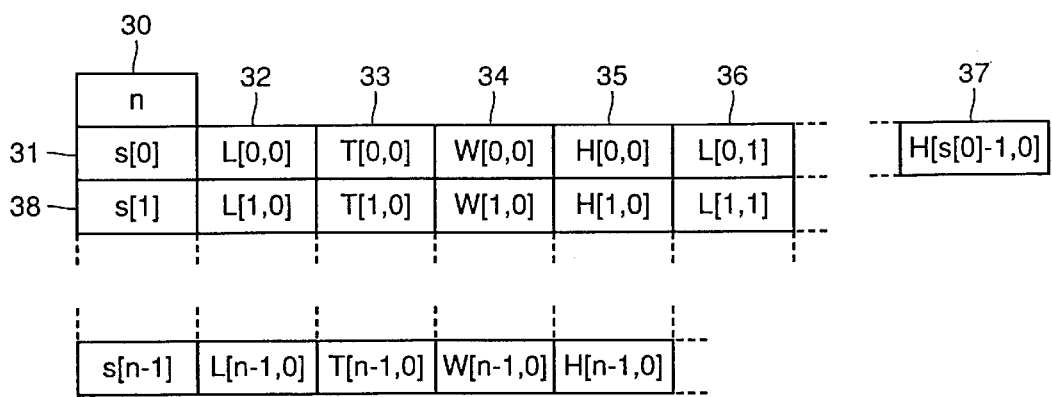
FIG. 13 schematically shows a manner of storing divided line region information.

Information of the divided line regions which is obtained by the processing in step S8 is stored in the memory taking the form shown in FIG. 13. A cell 30 stores the total number of lines of character strings on the input image. A cell 31 stores a number s[0] of the divided line regions which are present in the first line. On the memory space, region information of the divided line regions of s[0] in number is stored after cell 31. Cells 32–35 store region information of the first divided line region in the first line. More specifically, cells 32 and 33 store coordinate values (L[0, 0], T[0, 0]) of the upper left corner of the divided line region, and cells 34 and 35 store the width and height (W[0, 0], H[0, 0]) of the divided line region. Cells following cell 35 store the region information of the divided line regions in a similar sequence. Therefore, cell 37 for storing the last divided line region information in the first line stores the height H[0, s[0]−1] of the divided line region in the s[0]-th position. Cell 38 in the position next to cell 37 on the memory space stores the number s[1] of the divided line regions in the next line. Cells following cell 38 store the divided line region information similarly to the first line. It is assumed that each of the cells storing the region information of the divided line regions is formed of 2 bytes, and the cell storing the number of divided line regions is formed of 1 byte. A pointer to the cell storing the information of the width of the divided line region at the third position in the second line is calculated by ((pointer value of s[0])/(1+(8×s[0]))+(1+8×2+2×(3−1))).

Figure 14:
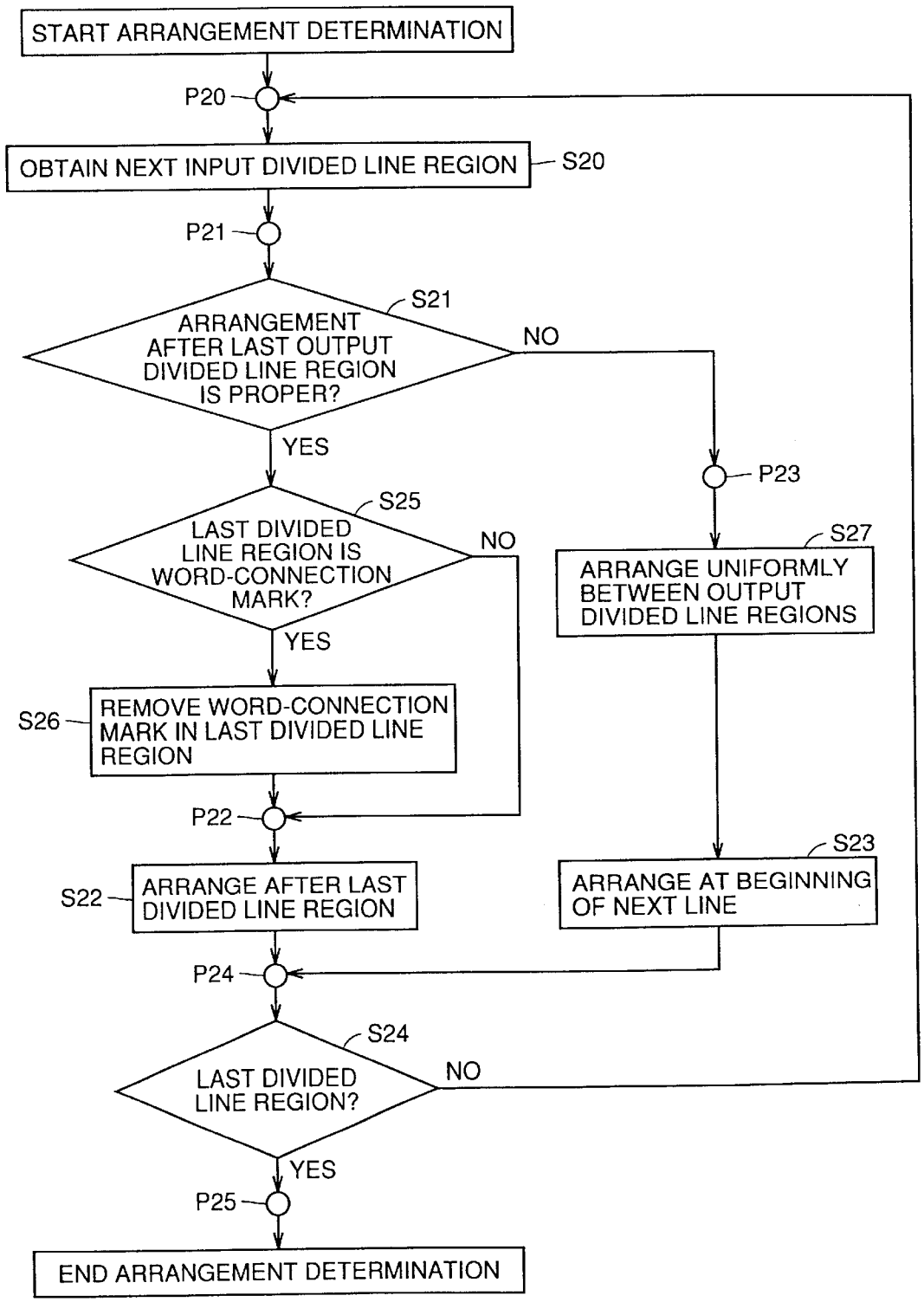
FIG. 14 is a flow chart showing an operation of an arrangement determining portion 4 shown in FIG. 1.

Referring to FIG. 14, description will be given on the operation of arrangement determining portion 4 in FIG. 1. For simplicity reason, the divided line region in the input image is referred to as an "input divided line region" in the following description, and the divided line region arranged by the arrangement determining portion 4 is referred to as an "output divided line region". It is assumed that the output divided line region information determined by arrangement determining portion 4 is stored in a manner similar to that already described with reference to FIG. 13. If the output image cannot be arranged within one page, and must be arranged over two or more pages, two or more items of the output divided line region information are ensured. For storing the plurality of items of the ensured output divided line region information, an array for storing the pointer values (i.e., address represented by four bytes) for each item of the output divided line region information is prepared, and the output divided line region information is managed based on this array. This array will be referred to as an "output arrangement array", hereinafter.

Access to the output divided line region information, e.g., in the nth position can be performed by referring to the value of the element at the nth position in the output arrangement array. The element at the nth position in the output arrangement array is stored in the address designated by adding (n×4) to the address at which the element in the 0th position is stored.

In the following description, it is assumed that access to the output divided line region information is performed in the manner already described, unless otherwise specified. It is also assumed that 0 is set in a current output page number representing the arrangement of the output divided line region information which is currently prepared. The total number of output pages depends on the designated zoom rate and the manner of rearrangement. For example, if the input image in one page is doubled, the total number of output pages is substantially equal to 4 pages.

Arrangement determining portion 4 acquires the next input divided line region to be processed (step S20). Arrangement determining portion 4 holds a value (which will be referred to as an "input line index value", hereinafter) indicating the position of the line of the input divided line region, which is currently processed, and a value (which will be referred to as an "input divided line region index value", hereinafter) indicating the position of the line including the divided line region, which is currently processed. Therefore, the input divided line region can be obtained in accordance with the manner already described with reference to FIG. 13. In a step S20, arrangement determining portion 4 compares the value, which is obtained by adding one to the input divided line region index value, with the number of divided line regions in the current line (i.e., the line being processed). If the input divided line region index value exceeds the number of divided line regions, the divided line region at the first position in the next line is obtained. Thus, the input line index value is incremented by one, and the input divided line region index value is set to 0.

Arrangement determining portion 4 determines whether it is proper or not to arrange the next input divided line region, which is obtained in step S20, after the output divided line region which is arranged last (step S21). When it is proper to arrange the next input divided line region after the last output divided line region (YES in step S21), the processing moves to a step S25. When it is not proper (NO in step S21), the processing moves to a step S27.

In step S25, arrangement determining portion 4 determines whether the preceding divided line region is a word connection character or not. In the case of, e.g., English text, a long word, which is present at an end of a line, may be divided in an appropriate position such that the front portion is located in the end of the line together with a hyphen, and the rear portion is disposed in the next line. In this case, the word connection character is the hyphen. If the line is divided based on units other than the character, it is difficult to determine whether the hyphen is to be placed or not. Accordingly, in the case where the line is divided based on units other than the character, processing in steps S25 and S26 is eliminated.

If the preceding character (divided line region) is a hyphen, and is the last character in the same line, arrangement determining portion 4 determines that the preceding divided line region is the word connection character (YES in step S25), and the processing moves to a step S26. If the arrangement determining portion 4 determines that the preceding divided line region is not the word connection character (NO in step S25), the processing moves to a step S22 via a connector P22. Determination of whether the preceding divided line region is a hyphen or not is generally performed by character recognizing processing, but can be performed even by simple processing in this example. More specifically, if the divided line region has the horizontal width (character width) substantially equal to those of the other divided line regions (character regions), but has the height nearly equal to zero, and the character is present at or near the center in the vertical direction, the character can be determined as a hyphen. It is assumed that the preceding divided line region is in the position of (Lp, Tp) and has a size of (Wp, Hp). It is also assumed that the divided line region being currently determined is in the position of (Lg, Tg) and has the size of (Wg, Hg). In this case, the determination of the hyphen can be performed by determining whether all the three formulas described below are satisfied or not. In the following formulas, "abs( )" represents an absolute value, and Tw, Th and Tp represent thresholds, respectively.

$abs(Wg-Wp)<Tw$ $Hg/Hp<Th$ $abs((Tg+Wg/2)-(Tp+Wp/2))<Tp$

In step S26, arrangement determining portion 4 removes the preceding character, i.e., the hyphen from the output image because it is already determined in step S25 that the preceding character is the hyphen. Thereby, two divided portions of the word are finally joined together on the output image. If the input divided line region is still present although the output divided line regions are removed, complicated processing is required in zooming and arranging portion 5, which will be described later. Therefore, it is preferable to eliminate the corresponding input divided line region together with the output divided line region. For removing the input divided line region, the number of divided line regions in the line in question is reduced by one, and the subsequent divided line region information is copied into the storage position of the divided line region information in question until the last information is copied, while successively shifting the information by the bytes equal in number to the bytes of one item of the divided line region information. The output divided line region is being prepared. Therefore, it is required to merely reduce the number of divided regions by one, and reduce the divided region index value by one. After the processing in step S26, the processing moves to step S22 via connector P22.

In step S22, it is determined that the next input divided line region can be appropriately arranged after the output divided line region. Therefore, arrangement determining portion 4 arranges the next input divided line region after the last output divided line region. Thereafter, the processing moves to a step S24 via a connector P24.

In a step S27, arrangement determining portion 4 rearranges the output divided line regions such that the output divided line regions located in the current output line are uniformly spaced from each other. Arrangement determining portion 4 sets the position of the input divided line region to the first position in the next output line (step S23). Thereafter, the processing moves to a step S24 via a connector P24.

After the processing in step S22 or S23, arrangement determining portion 4 determines whether the input divided line region is the final divided line region or not (step S24). If the input divided line region is the last divided line region (YES in step S24), processing in arrangement determining portion 4 is completed. If the input divided line region is not the last divided line region (NO in step S24), the processing moves to step S20 via a connector P20.

Figure 15:
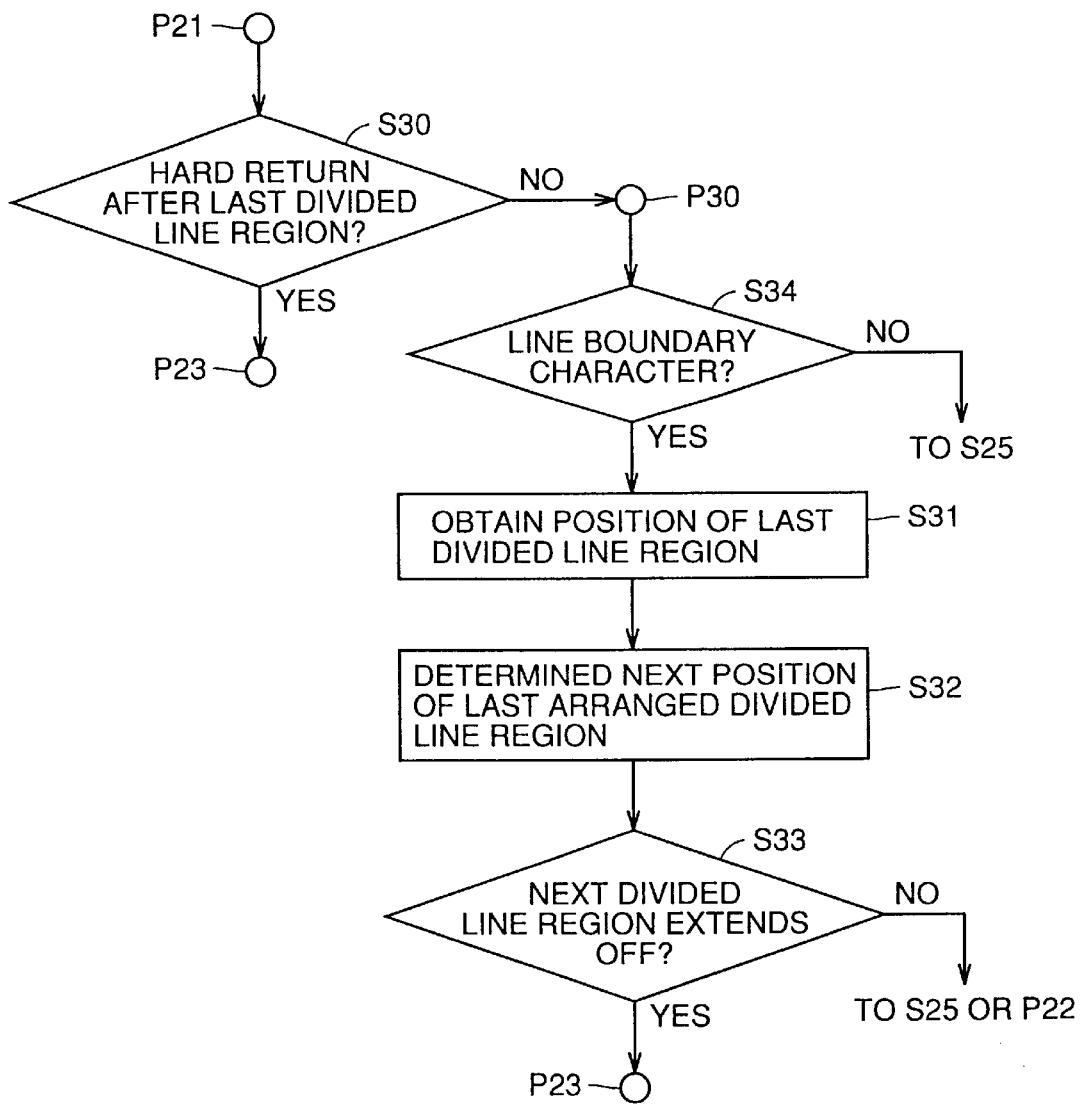
FIG. 15 is a flow chart specifically showing processing in a step S21 shown in FIG. 14.

Referring to FIG. 15, description will now be given on the processing in step S21 shown in FIG. 14. Arrangement determining portion 4 determines whether a newline character follows the last input divided line region or not (step S30). When it is determined that the newline character follows the last input divided line region (YES in step S30), the next input divided line region is arranged as the leading end of the next line. Therefore, it is determined that it is improper to arrange the next input divided line region after the last output divided line region, and the processing moves to a next connector P23. When it is determined that the newline character is placed after the last input divided line region, the next input divided line region is arranged in the next line. Therefore, the newline character in the input image is reflected on the output image, and newline saving, which is a kind of column arranging processing, is achieved. The newline is used for representing certain meaning such as a different context in many cases. Therefore, this effect of newline can be advantageously maintained on the output image.

When it is determined that a newline return does not follow the last input divided line region (NO in step S30), arrangement determining portion 4 determines whether the character in the divided line region is a line boundary character or not (step S34). The line boundary characters are "○", """, ".", ",", "?" and "!", which are not to be arranged in the leading end of the line in usual cases. Determination of whether a character is the line boundary character or not is difficult unless the line is divided on the character basis. If the line is divided on the basis other than the character, the above processing is eliminated, and the processing moves from step S30 to step S31.

Determination of whether the character is the line boundary character or not is generally performed by the character recognition. Since the kinds of characters to be determined are small in number, the determination can be performed by simple recognition processing. For example, if the character is the Japanese punctuation mark, a period or a comma, it has a smaller area than other character regions, and is located in a lower position. Therefore, if the region information of the divided line region satisfies the above conditions, the character providing this information can be determined as the line boundary character.

If characters "?" and "!" are to be recognized, binary bit maps of "?" and "!" having appropriate sizes are prepared in advance, and the divided line region is zoomed to match with the size of the bit map before it is changed into a binary form. After this change into the binary form, pattern matching is performed between the divided line region and the bit map, and the matched pixels are counted. If the number of matched pixels exceeds a certain threshold, it is determined that the character is "?" or "!". If it is determined in the above processing that the character in the divided line region is not the line boundary character (NO step S34), the next input divided line region is arranged in the leading end of the next line. Therefore, it is determined that the next input divided line region can be appropriately arranged after the last output divided line region, and the processing moves to step S25.

When it is determined that the character in the divided line region is the line boundary character (YES in step S34), arrangement determining portion 4 obtains the position of the last output divided line region (step S31). This can be performed easily by holding the position of the output divided line region which was arranged last. Arrangement determining portion 4 obtains the position next to the last output divided line region (step S32). The "position next to the last output divided line region" means the position of the region, that forms a continuous line together with the last output divided line region. In the example of the image shown in FIG. 8, the position next to a divided line region 25 is occupied by a divided line region 26 on the right side of region 25.

Arrangement determining portion 4 determines whether the next input divided line region extends off the output image if the next input divided line region is arranged in the position next to the last output divided line region (step S33). If it is determined that the input divided line region extends off the output image (YES in step S33), it is determined that the input divided line region cannot be appropriately arranged after the last output divided line region (NO in step S21), and the processing moves to connector P23. When it is determined that the input divided line region does not extend off the output image (NO in step S33), it is determined that the input divided line region can be appropriately arranged after the last output divided line region, and the processing moves to step S25 or connector P22.

Figure 16:
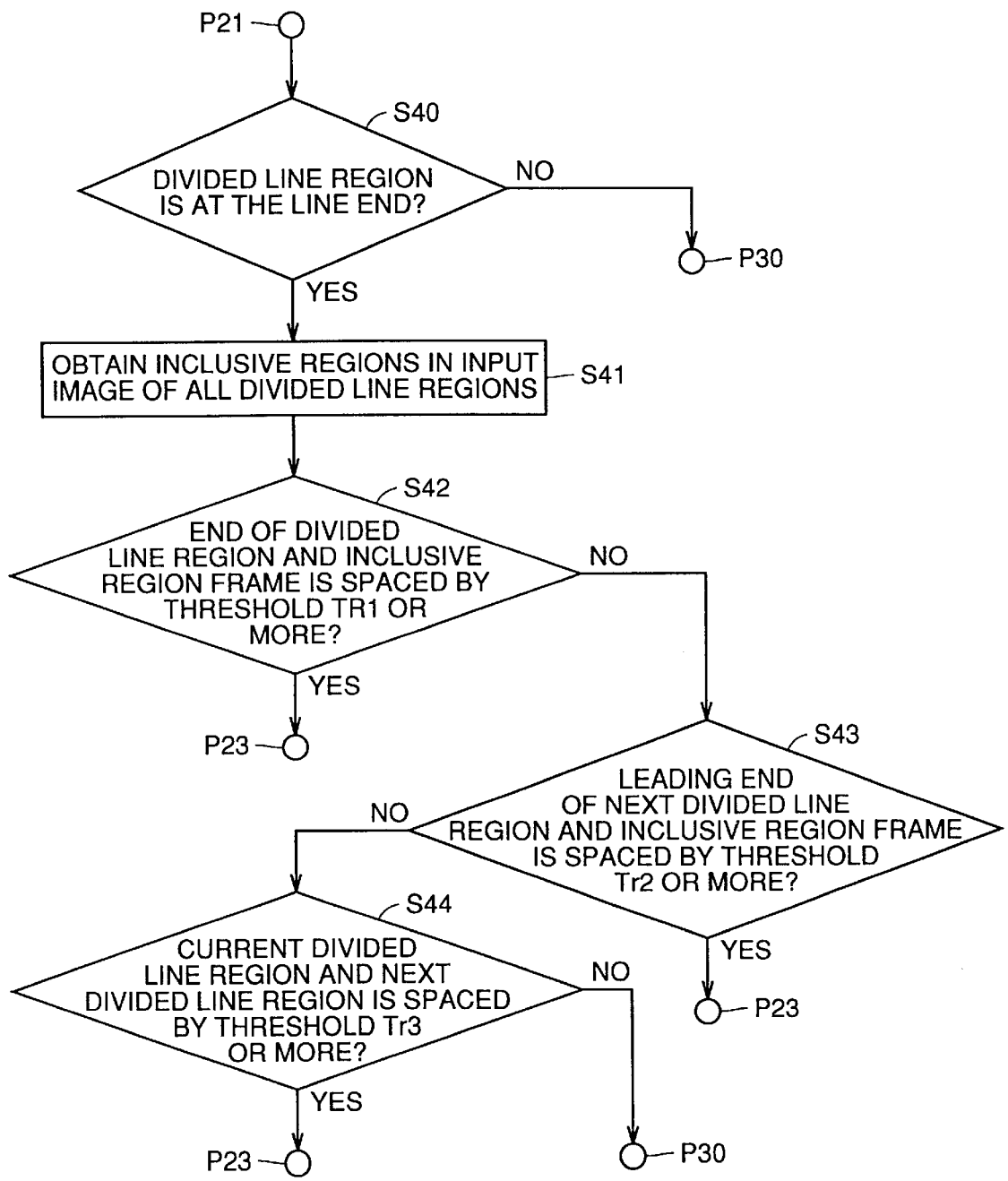
FIG. 16 is a flowchart specifically showing processing in a step S30 shown in FIG. 15.

Referring to FIG. 16, a step S30 in FIG. 15 will now be described in greater detail. Arrangement determining portion 4 determines whether the input divided line region in question is the last input divided line region in the same line or not (step S40). When it is determined that the input divided line region is not the last input divided line region in the same line (NO in step S40), there is no possibility that a newline starts after the input divided line region in question so that the processing moves to a connector P30.

When it is determined that the input divided line region in question is the last input divided line region in the same line (YES in step S40), a newline may start after this input divided line region. Therefore, arrangement determining portion 4 obtains an inclusive region (outer-contact rectangle) of all the input divided line regions (step S41). It is assumed that the inclusive region has the upper left coordinates (Lc, Tc) and the lower right coordinates (Rc, Bc). The upper left X coordinate Lc is the minimum value of the left end position of all the input divided line regions, and the upper left Y coordinate Tc is the minimum value of the upper end of all the input divided line regions. The lower right X coordinate Rc is the maximum value of the right end position (left end position plus width) of all the input divided line regions, and the lower right Y coordinate Bc is the maximum value of the lower end (upper end position plus height) of the input divided line region.

Arrangement determining portion 4 determines whether a distance in the line direction between the end of the input divided line region in question and a frame of the inclusive region is larger than a threshold Tr1 (step S42). If the distance is larger than threshold Tr1, it can be considered that the newline starts (step S42). For example, it is assumed that the input divided line region in question has upper left coordinates (L1, T1) and sizes (W1, H1). It is determined that the distance is large if this line is horizontal, and the following relationship is satisfied:

$$Rc-(L1+W1)>Tr1.$$

Threshold Tr1 may be of a fixed value, or may be set to a value of H1 corresponding to one character or (H1×2) corresponding to two characters. Instead of H1, a median of heights of the respective input divided line regions in each line may be obtained and used as the threshold corresponding to one character. If the line division is performed on the character basis, as will be described later, the width or height of the character may be used as it is. When it is determined that the distance is larger than threshold Tr1 (YES in step S42), it is determined that a newline starts after the last input divided line region, and the processing moves to connector P23.

When it is determined that the distance is equal to or smaller than threshold Tr1 (NO in step S42), arrangement determining portion 4 determines whether the distance between the leading end of the next input divided line region and the frame of the inclusive region is larger than threshold Tr2 (step S43). This is performed for the purpose of detecting indentation at the beginning of a paragraph. Even if an end portion of the last paragraph is substantially fully filled with characters, it can be determined by finding the indentation in the next line that a newline is intentionally set. The manner of this determination is performed similarly to that in a step S42. Assuming that the next input divided line region has upper left coordinates (L2, T2) and sizes (W2, H2), and the line in question is horizontal, it is determined that the distance is present, if the following relationship is satisfied:

$$L2-Lc>Tr2.$$

Threshold Tr2 may be determined similarly to threshold Tr. When it is determined that the distance is larger than threshold Tr2, and thus the indentation is present (YES in step S43), it is determined that a newline starts after the last divided line region, and the processing moves to connector P23.

When the distance is equal to or smaller than threshold Tr2 (NO in step S43), arrangement determining portion 4 determines whether a distance between the input divided line region in question and the next input divided line region is larger than a threshold Tr3 or not (step S44). If the distance is larger than threshold Tr3, an indent may not be present in the next line, but it can be considered that the paragraph ends in the line in question. Therefore, it can be considered that a newline starts after the space. For example, it is assumed that the input divided line region in question has upper left coordinates (L1, T1) and sizes (W1, H1), and the next input divided line region has upper left coordinates (L2, T2) and sizes (W2, H2). It is determined that a newline is present if this line is horizontal, and the following relationship is satisfied:

$$T2-(T1+H1)>Tr3$$

Threshold Tr3 may be, for example, equal to double the line height, i.e., (H1×2) or (H2×2).

When the foregoing relationship is satisfied (YES in step S44), it is determined that the newline is present after the last divided line region, and the processing moves to connector P23. When the foregoing relationship is not satisfied (NO in step S44), it is determined that the newline is not present after the last divided line region, and the processing moves to connector P30.

Referring to FIG. 15 again, the following manner can be employed for determining the position next to the output divided line region, which is arranged last by the processing in step S32. It is assumed that the output divided line region which is arranged last has upper left coordinates (L3, T3) and sizes (W3, H3), the next input divided line region has sizes (W4, H4), zoom rates (Rx, Ry) in the vertical and horizontal directions are obtained from zoom information designating portion 3, and the input divided line regions are spaced by a distance of Ir. The line is horizontal. In this case, the input divided line region has sizes (W5, H5) expressed by the following formulas after arrangement:

$$W5=W4\times Rx$$

$$H5=H4\times Ry.$$

Upper left coordinates (L5, T5) are expressed by the following formulas:

$$L5=L3+W3+Ir$$

$$T5=T3+(H3/2)-(H4\times Ry/2).$$

The vertical positions of the divided line regions are set such that all the input divided line regions in the same line have centers in the same vertical position.

Distance Ir may be obtained by multiplying a calculated average distance between the character regions by Rx, if the line is divided on the character basis, as will be described later. In the other cases, the results of projection of the divided line regions are changed into a binary form, as already described in connection with the processing in step S6 shown in FIG. 3, and the run length value of the background pixels is handled as the distance between the character regions, whereby the average value of the distances between the neighboring input divided line regions is obtained, and is handled as distance Ir.

Referring to FIG. 15, it is determined in a step S33 whether the next input divided line region is to be arranged in the position obtained in step S32 or not. In other words, it is determined whether the input divided line region arranged at the above position in the horizontal line extends rightward off the output image or not. The arranged input divided line region has the right end, of which x coordinate R5 is expressed by the following formula:

$$R5=L5+W5$$

This is compared with horizontal width Wo, and it is determined that the input divided line region extends off the output image if R5 is larger than Wo. If the output image has margins including a right margin Mr, it is determined that the input divided line region extends off the output image when R5 is larger than (Wo−Mr).

Referring to FIG. 14 again, the following technique can be employed for arranging the next input divided line region after the last output divided line region in step S22. If the line is horizontal, the horizontal arrangement position is obtained by the processing in step S32 shown in FIG. 15. Therefore, the value obtained thereby is used. The vertical arrangement position may be determined such that the center of the last output divided line region is in the same vertical position as the center of the divided line region to be arranged, as already described in connection with step S32. All the output divided line regions belonging to the same line may be arranged to have the centers in the same vertical position by using the average value or the median of the vertical positions. The size of the output divided line region may be determined by multiplying the value obtained by the processing in step S32, i.e., size (Rx, Ry) of the input divided line region by (Rx, Ry).

If divided line region information is stored in the format shown in FIG. 10, similar storage regions may be prepared, and the divided line region information may be additionally and successively stored therein as soon as the address for arrangement is determined. For adding the divided line region information, the number of divided line regions to be included in the same line is increased by one. When the position for arranging the divided line region first moves to the next line, the divided line region information is added as the first divided line region of the next line.

Figure 17:
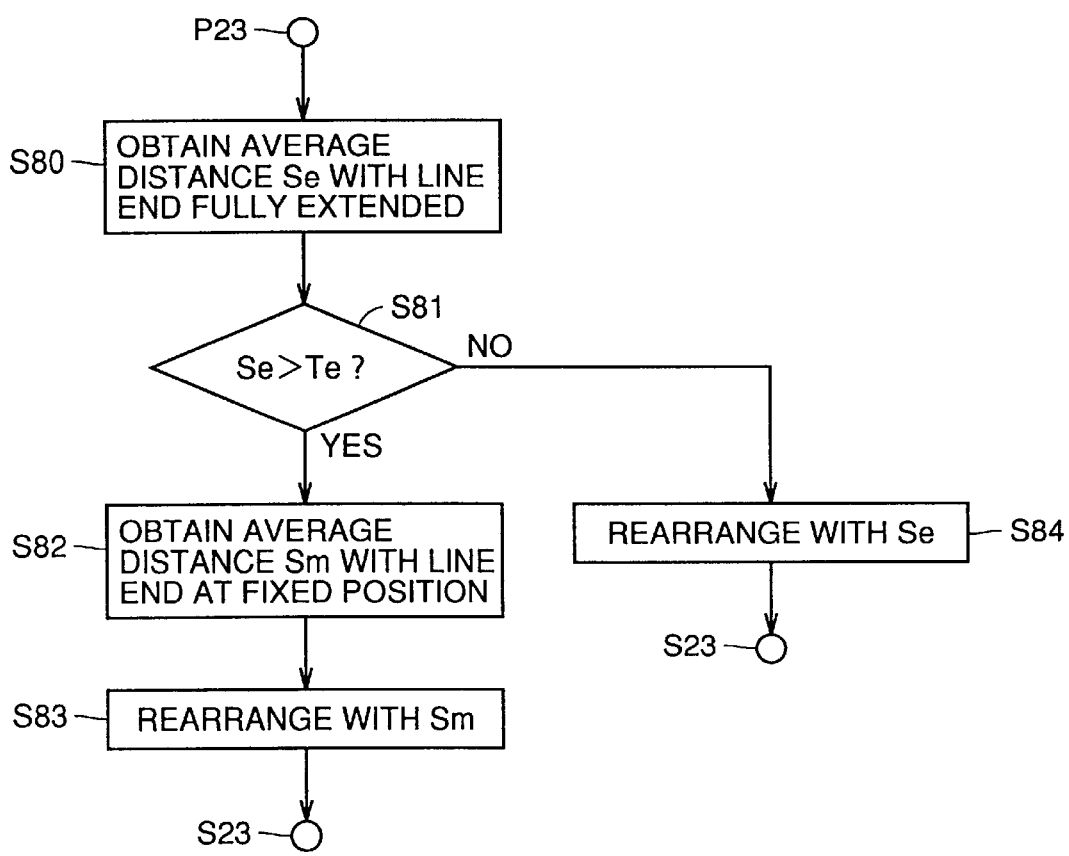
FIG. 17 is a flowchart specifically showing processing in a step S27 shown in FIG. 14.

Referring to FIG. 17, the processing in step S27 shown in FIG. 14 will now be described in greater detail. In the following description, it is assumed that the output divided line region in the current output line is to be processed, and the line is horizontal. Arrangement determining portion 4 calculates an average distance Se between the output divided line regions (step S80) in such a case that the position of the output divided line region in the leading end of the line is fixed, and the output divided line region in the trailing end of the line is in the end of the arrangeable range of the output image. For example, it is assumed that the output divided line regions are n in number, and the divided line region in the ith position has a left coordinate L[i] and a width W[i] (i=0, 1, . . . , n−1). In this case, average distance Se is expressed by the following formula:

$$Se=(Wo-Mr-L[0]-(W[0]+\ldots+W[n-1]))/(n-1).$$

Arrangement determining portion 4 compares average distance Se with a predetermined threshold Te (step S81). When average distance Se is larger than a predetermined threshold Te (YES in step S81), it is determined that rearrangement with average distance Se will excessively increase the distance between divided line regions, and processing in and after a step S82 is performed. When average distance Se is equal to or smaller than threshold Te (NO in S81), processing in a step S84 is performed.

In step S82, arrangement determining portion 4 fixes the positions of the output divided line regions in the leading and trailing ends of the line, and calculates an average distance Sm between the output divided line regions based on the following formula:

$$Sm=(L[n-1]-L[0]-(W[0]+\ldots+W[n-1]))/(n-1).$$

Arrangement determining portion 4 rearranges the output divided line regions using average distance Sm (step S83), and the processing moves to step S23. After the rearrangement, the divided line region in the ith position has the left end coordinate L[i], which is expressed by the following formula (i=1 ... n−1)

$$L[i]=L[i-1]+W[i-1]+Sm.$$

In a step S84, arrangement determining portion 4 rearranges the output divided line regions using average distance Se (step S84), and the processing moves to step S23. After the rearrangement, the divided line region in the ith position has the left end coordinate L[i], which is expressed by the following formula (i=1 ... n−1)

$$L[i]=L[i-1]+W[i-1]+Se.$$

Figure 18:
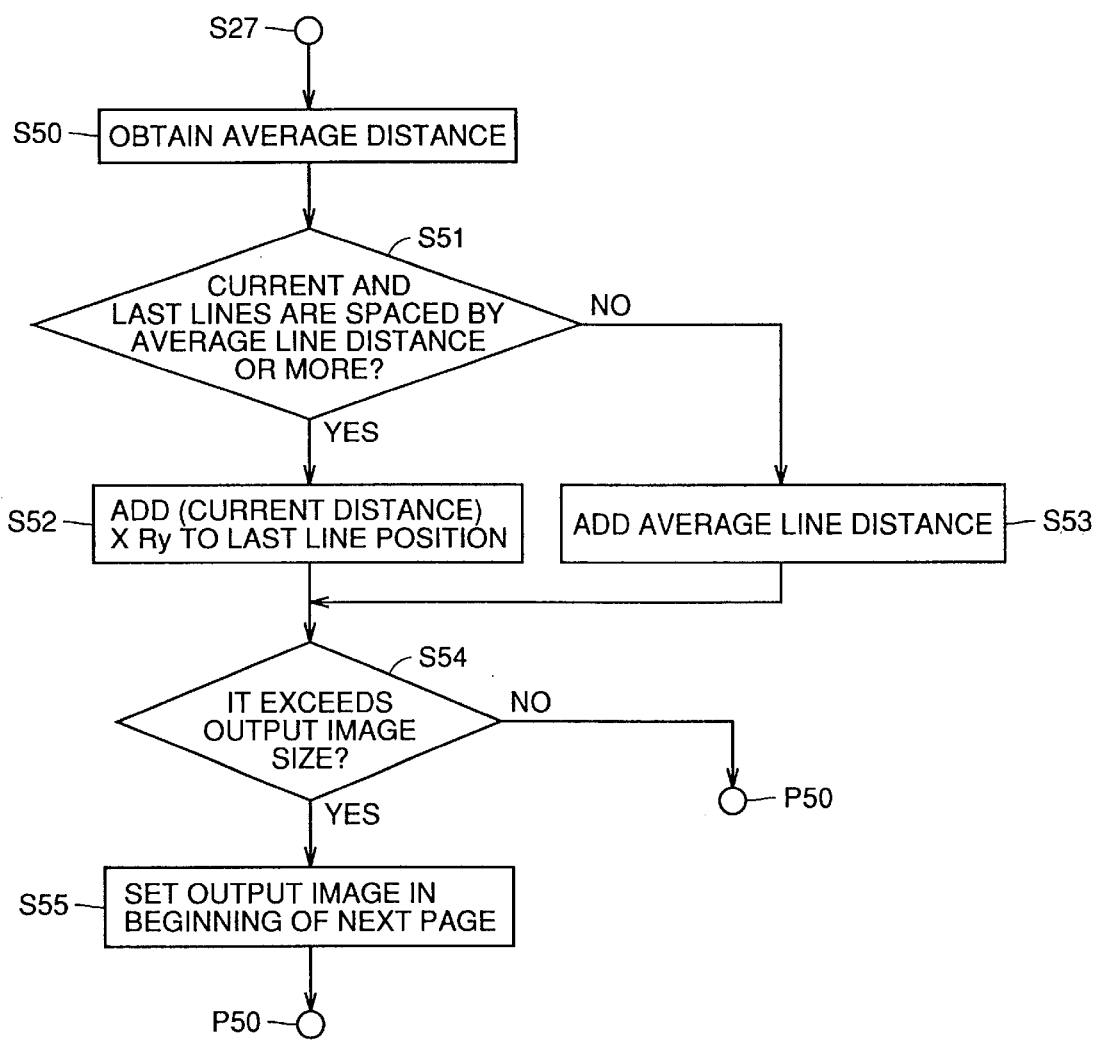
FIG. 18 is a flowchart specifically showing processing for determining a vertical position in a step S23 shown in FIG. 14.
Figure 19:
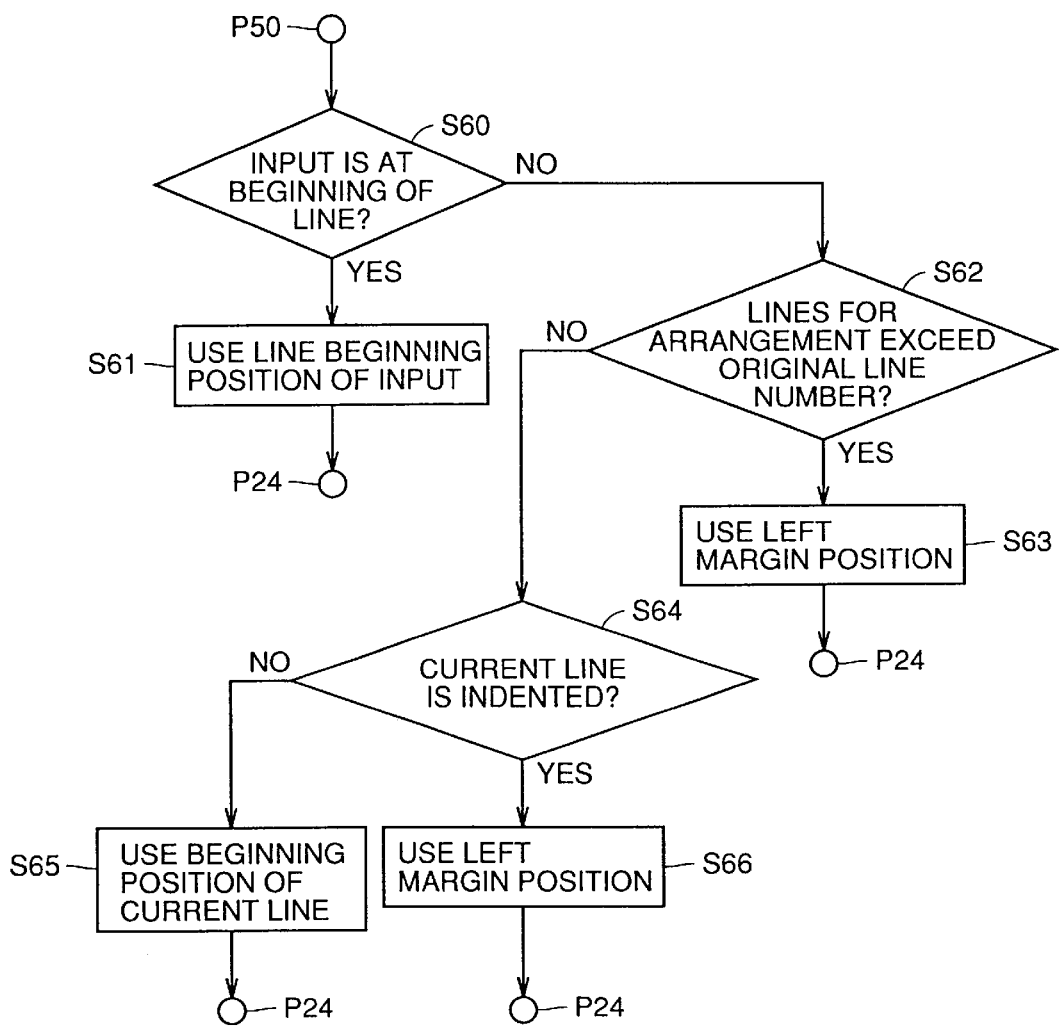
FIG. 19 is a flowchart specifically showing processing for determining a horizontal position in step S23 shown in FIG. 14.

Referring to FIGS. 18 and 19, processing in step S23 shown in FIG. 14 will now be described in greater detail. Arrangement determining portion 4 calculates an average line distance Lm (step S50). The average line distance is an average of distances between neighboring lines (distances between upper and lower lines if the line is horizontal). Assuming that the lines are n in number, average line distance Lm can be obtained by calculating an average value of T[d+1, 0]−T[d, 0] (d=0 ... n−2). If one or some of the lines contain large characters or pictures, a median may be used as average line distance Lm instead of the average.

Arrangement determining portion 4 divides the distance between the upper positions of the input divided line region and the input divided line region in the last line by average line distance Lm, and determines whether the value obtained by this division is equal to or larger than a threshold Tm or not (step S51). When the obtained value is equal to or larger than threshold Tm (YES in step S51), it is determined that a blank line is present between the current and the last lines, and processing in and after a step S52 is performed. When the obtained value is smaller than threshold Tm (NO in step S51), it is determined that a blank line is present between the current and last lines, and processing in and after a step S53 is performed. In many cases, threshold Tm can be set in a range from about 1.5 to about 2.0.

Processing in step S52 is performed based on the determination in step S51 that the blank line is present between the current and last lines. If the line is horizontal, arrangement determining portion 4 adds ((the distance between the current and last lines)×Ry) to the upper position of output divided line region in the last line, and the value thus obtained is used as the new upper position of the output divided line region. In many cases, the blank line means the end of the paragraph or the like. Through the foregoing processing, the blank line in the input image is also kept in the output image. Therefore, blank keeping, which is a kind of column arranging processing, is performed.

Processing in step S53 is performed when it is determined by the processing in step S51 that the blank line is not present between the current and the last lines. If the line is horizontal, therefore, arrangement determining portion 4 adds (Lm×Ry) to the upper position of the output divided line region in the last line, and the value obtained by this addition is used as the new upper position of the output divided line region.

After the processing in step S52 or S53, arrangement determining portion 4 determines whether the divided line regions arranged in accordance with the obtained arrangement position extend off the arrangeable range of the output image or not (step S54). Assuming that Ta represents the upper end position of the output divided line region obtained in step S52 or S53, and Ha represents a height of the input divided line region, a low end Ba of the output divided line region can be expressed by the following formula:

$$Ba=Ta+Ha\times Ry.$$

Assuming that the output image has a lower margin of Mb, arrangement determining portion 4 determines that the divided line region does not extend off the arrangeable range of the output image when the following formula is satisfied.

$$Ba<Wo-Mb.$$

If the above formula is not satisfied, it is determined that the divided line region extends off the arrangeable range of the output image. Thus, it is determined in step S54 whether the divided line region to be arranged can be located within the current output page.

When it is determined that the size of divided line region exceeds that of the output image (YES in step S54), arrangement determining portion 4 ensures a region for new output divided line region information for the output image. Further, arrangement determining portion 4 adds the pointer value of the new region thus ensured to the output arrangement array, and increases the current output page number by one. Also, it sets the output line index value and the input divided line region index value to 0. Thereafter, arrangement determining portion 4 records the vertical position of the output divided line region in the information region (step S55). The divided line region is arranged in the first line. Therefore, the vertical position of the output divided line region can be set to a margin amount Mt of the output image.

After the processing in step S55, or when it is determined that the divided line region does not extend off the output image (NO in step S54), arrangement determining portion 4 determines whether the input divided line region to be processed was located in the leading end of the line in the input image (step S60). This determination can be easily performed by determining whether the divided line region index value is equal to 0 or not.

When it is determined that the input divided line region was located in the leading end of the input image (YES in step S60), arrangement determining portion 4 likewise arranges the divided line region in the leading end of the output image (step S61), and the processing moves to connector P24. Assuming that the horizontal position of the input divided line region is Li, and the left margin of the output image is M1, the left end position of the output divided line region is expressed by the following formula:

$$\text{Left end position}=(Li-Lc)\times Rx-M1.$$

When it is determined that the input divided line region is not located in the leading end of the line of the input image (NO in step S60), arrangement determining portion 4 determines whether the index value of the output line, in which the input divided line region is to be arranged, exceeds the total line number of the input image or not (step S62). This determination is performed similarly to the processing in step S50 shown in FIG. 18. Therefore, specific description thereof is not repeated.

When the output line index value exceeds the total line number of the input image (YES in step S62), the left end position of the inclusive region of all the input divided line regions, which are required in the processing in step S41 shown in FIG. 16, is set as the horizontal position of the output divided line region (step S63), and the processing moves to connector P24. It has been determined that the output line index value exceeds the total number of the input image in step S62. Therefore, there is no line to which reference can be made when determining the horizontal position of the output divided line region. Therefore, a left margin width M1 of the output image is used as the left end position of the output divided line region.

When the output line index value does not exceed the total line number of the input image (NO in step S62), arrangement determining portion 4 determines whether the input divided line region at the leading end is indented or not in the input line having the line index value equal to the output line index value (step S64). Determination of whether the input divided line region at the leading end is indented or not is performed similarly to the indent detection in step S43 shown in FIG. 16. Therefore, description thereof is not repeated here.

When it is determined that the input divided line region in the leading end is not indented (NO in step S64), processing in a step S65 is performed. In step S65, it is determined that the input divided line region is not located at the beginning of the line. Assuming that the output line index value is equal to Ln, therefore, the horizontal position L[Ln−1, 0] of the first input divided line region in the line, of which input line index value is equal to Ln, is selected as the horizontal position of the output divided line region (step S65). Thereafter, the processing moves to connector P24.

When it is determined that the input divided line region at the beginning of the line is indented (YES in step S64), processing in a step S66 is performed. Processing in step S66 is performed when it is determined in step S60 that the input divided line region is not located at the beginning of the line, and it is determined in step S64 that the input divided line region is arranged in the line including the indented input divided line region at the beginning. Therefore, the position of the leading end of the indented input divided line region cannot be used for calculation of the horizontal position of the output divided line region. Accordingly, arrangement determining portion 4 sets left margin width M1 of the output image as the left end position of the output divided line region, similarly to the processing in step S63, and the processing moves to connector P24.

Figure 20:
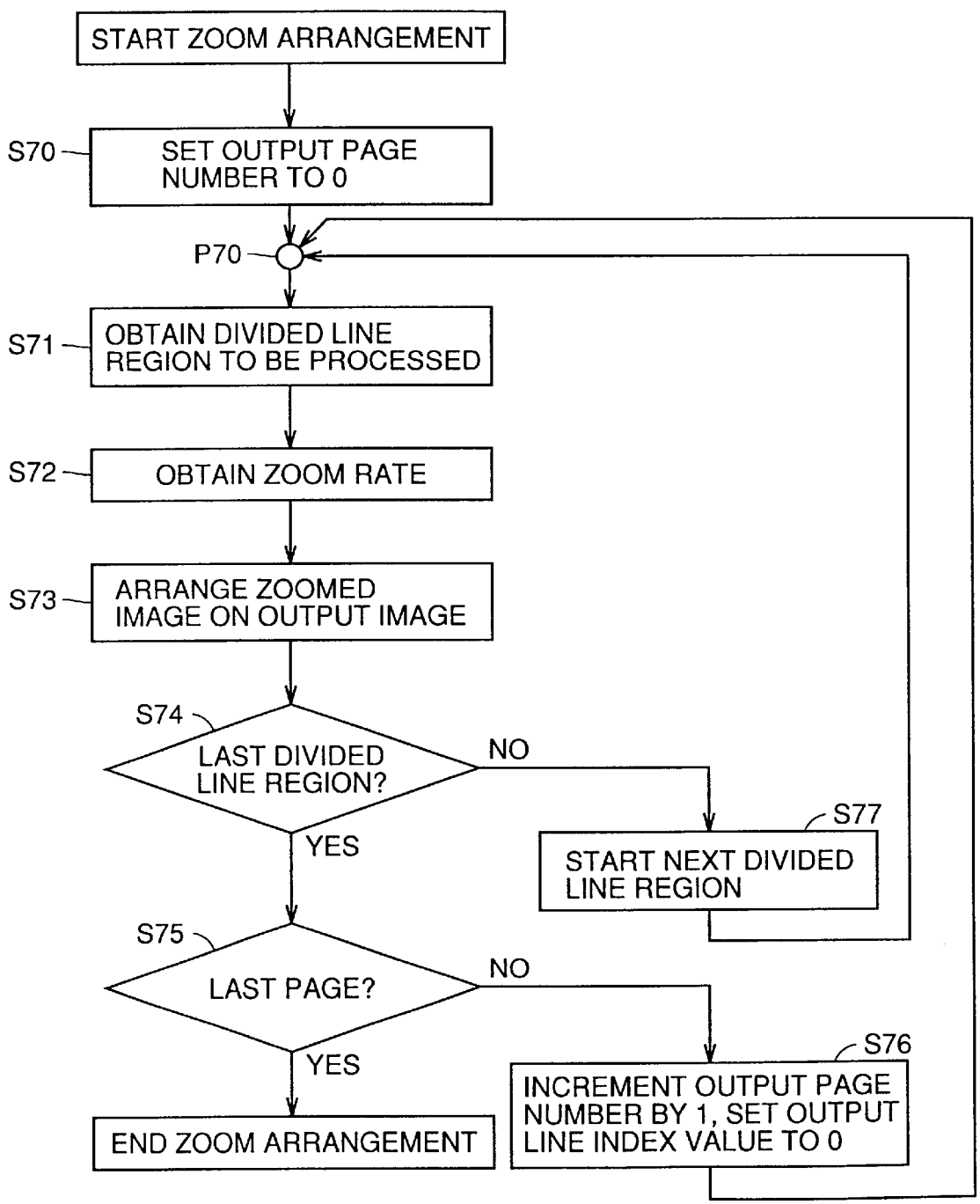
FIG. 20 is a flowchart showing an operation of a zooming and arranging portion 5 in FIG. 1.

Referring to FIG. 20, zooming and arranging portion 5 in FIG. 1 operates as follows. Zooming and arranging portion 5 sets the output page number, input line index value, input divided line region index value, output line index value and output divided line region index value to 0 (step S70). Thereafter, the output divided line region information to be accessed is specified by the output page number and the output line index number in the output arrangement array.

Zooming and arranging portion 5 then obtains the information of the input divided line region to be processed and the output divided line region (step S71). This can be obtained by accessing the storage region using the input line index value, input divided line region index value, output line index value and output divided line region index value.

Zooming and arranging portion 5 obtains the zoom rate (step S72). If zoom information designating portion 3 has designated the fixed zoom rate, the value thus designated is used as it is. As will be described later, the zoom rate may be variable depending on the divided line regions. If variable, the size of the output divided line region is divided by the size of the input divided line region to obtain the zoom rate. If the input and output divided line regions have the same aspect ratio, it is required to merely calculate the vertical or horizontal zoom rate. If the input and output divided line regions have different aspect ratios, respectively, it is required to calculate each of the vertical zoom rate and the horizontal zoom rate from the ratios between the width and height.

Zooming and arranging portion 5 arranges the zoomed image of the output divided line region on the output image (step S73). This can be easily done by calculating the pixel values while performing raster-scanning of the pixels of the output divided line region from the upper left toward the lower right, and substituting the calculated values for the pixels. It is assumed that the output divided line region has a range defined by (Lo, To) to (Lo+Wi, To+Ho), and the input divided line region has a range defined by (Li, Ti) to (Li+Wi, Ti+Hi). In this case, the zoom rate (Rx, Ry) can be determined in accordance with the following formulas:

$$Rx = Wo/Wi$$

$$Ry = Ho/Hi.$$

An input position (Xi, Yi) corresponding to an arbitrary output position (Xo, Yo) is obtained by the following formulas:

$$Xi = Li + (Xo - Lo)/Rx$$

$$Yi = Ti + (Yo - To)/Ry.$$

Assuming that f(Xo, Yo) represents the pixel value of the output position (Xo, Yo), and g(Yi, Yi) represents the pixel value of the input position (Xi, Yi), the pixel value of the output image can be obtained by substituting pixel value g(Xi, Yi) for pixel value f(Xo, Yo) in accordance with the following formula:

$$f(Xo, Yo) = g(Xi, Yi).$$

Output position (Xi, Yi) is calculated while incrementing Xo by one between Lo and (Lo+Wo), and incrementing Yo by one between To and (To+Ho), and thereby pixel value g(Xi, Yi) is obtained so that all the pixel values in the output divided line region can be obtained. Xo is varied independently of Yo. If the output position (Xo, Yo) is represented by integers, the input position (Xi, Yi) is not necessarily represented by integers. Therefore, the values of input position (Xi, Yi) are rounded off to the nearest integers so that the nearest input pixel value is used as pixel value f(Xo, Yo). Alternatively, pixel value f(Xo, Yo) may be obtained by interpolating g(Xi, Yi) with the input pixel values at the near four points. Assuming that (Xii, Yii) and (Xis, Yis) represent the integral portion and the fractional portion of the input position (Xi, Yi), respectively, f(Xo, Yo) can be obtained by the following formula:

$$f(Xo, Yo) = (1-Yis) \times ((1-Xis) \times g(Xii, Yii) + Xis \times g(Xii+1, Yii)) + Yis \times ((1-Xis) \times g(Xii, Yii+1) + Xis \times g(Xii+1, Yii+1)).$$

In general, the pixel value obtained by interpolation can provide smoother display.

Input pixel value g(x, y) is obtained from the pixel value of the position (x, y) on the input image, which is stored in input image storing portion 1. Output pixel value f(x, y) can be substituted for the pixel in position (x, y) on the output image stored in output image storing portion 6.

Zooming and arranging portion 5 determines whether the output divided line region which is currently processed is the last divided line region in the current output divided line region information (step S74). If the output line index value is equal to ((line number)−1), and the output divided line region index value is equal to ((number of divided line regions)−1) in the same line, it is the last divided line region. If the output divided line region which is currently processed is the last region (YES in step S74), processing in and after step S74 is performed. If not (NO in step S74), processing in and after a step S77 is performed.

In step S75, zooming and arranging portion 5 determines whether the output page which is currently processed is the last page or not. More specifically, it is determined that the current output page is the last page when the last value of the current output page number used in arrangement determining portion 4 is equal to the output page number. If the output page which is currently processed is the last page (YES in step S75), processing in zooming and arranging portion 5 ends.

If the output page which is currently processed is not the last page (NO in step S75), zooming and arranging portion 5 increases the output page number by one, and sends a page switch signal to output image storing portion 6. Further, it advances the input divided line region by one, and sets the output line index value and the output divided line region index value to 0 (step S76). Thereafter, the processing advances to a connector P70. The input divided line region can be advanced by one by increasing the input divided line region index value by one. As a result, the input divided line region index value may become equal to the number of the divided line regions in the current line, in which case the input line index value is increased by one, and the input divided line index value is set to 0.

In step S77, zooming and arranging portion 5 advances each of the input divided line region and output divided line region by one, and the processing moves to connector P70. The manner of advancing the input and output divided line regions is similar to that of the processing in step S76. Therefore, detailed description thereof is not repeated. In this manner, pages of the output image accessed by zooming and arranging portion 5 are individually stored in output image storing portion 6.

Figures 23, 24:
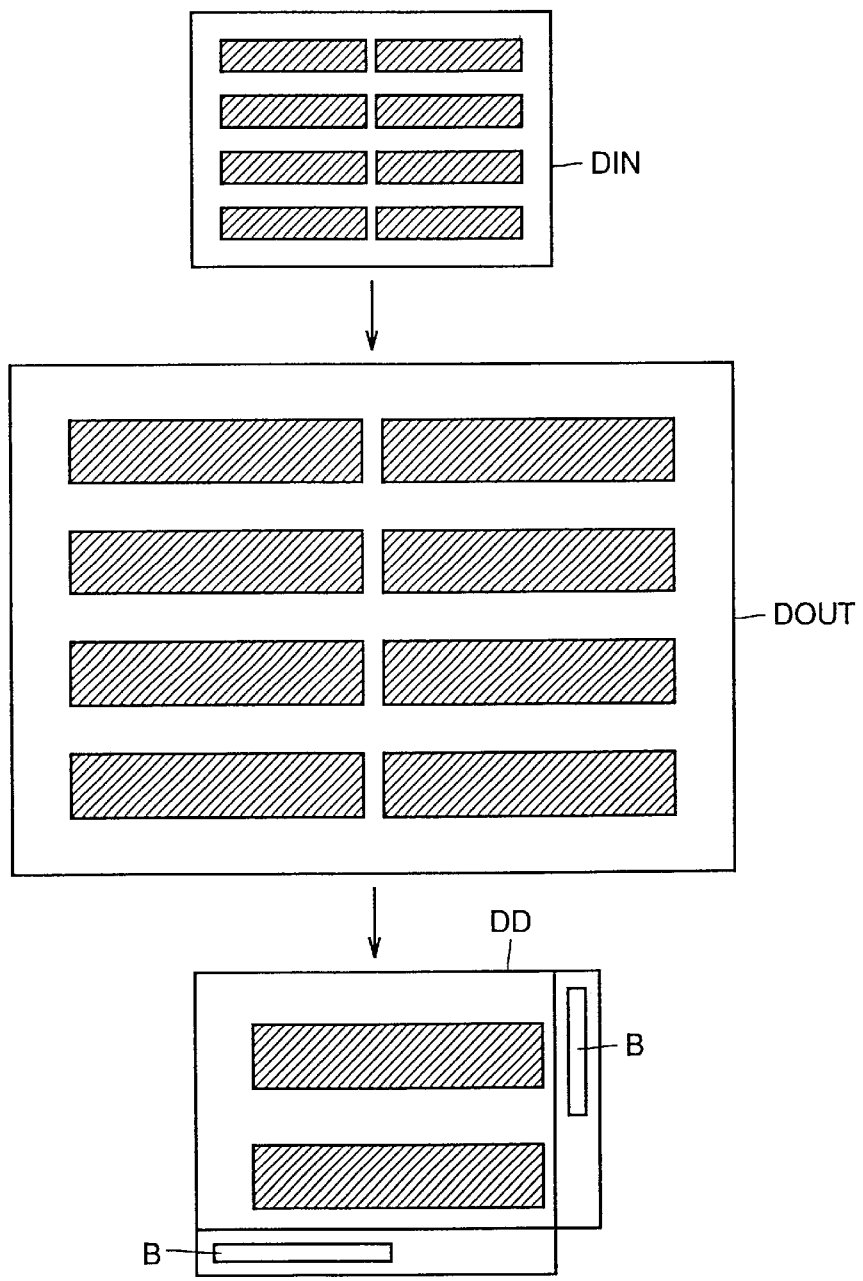

Referring to FIGS. 21 to 23, description will now be given on an example of the output image obtained by the foregoing processing. FIG. 21 shows an example, in which the input divided line regions in FIG. 8 are rearranged. In FIG. 21, the horizontal width is equal to that of the input image, and the zoom rate is two. Therefore, the horizontal width is the same as that of the input image, but the vertical width is about four times larger than that of the input image.

FIG. 22 shows an example, in which the input divided line regions in FIG. 9 are rearranged. In FIG. 22, the horizontal width is equal to that of the input image, and the zoom rate is three. Therefore, the horizontal width is the same as that of the input image, but the vertical width is about nine times larger than that of the input image.

FIG. 23 shows an example, in which the input divided line regions in FIG. 8 are rearranged. In FIG. 23, the horizontal width is equal to that of the input image, and the zoom rate is ½. Therefore, the horizontal width is the same as that of the input image, but the vertical width is about ¼.

The foregoing processing will now be described in greater detail. As already described with reference to FIG. 2, the output image has the display region of the same size as the input image, and is displayed on the same display screen 100.

The problem in the prior art will now be described again. It is assumed that the input image has the size of 100×100, and the display screen has the size of 100×100. If the zoom rate is two, the output image has the size of 200×200. An input image DIN, an output image DOUT and a display image DD are configured as shown in FIG. 24. As compared with the size of output image DOUT, displayed image DD has a small size. Therefore, the user must perform the scrolling in the vertical and horizontal directions by scroll bars B for viewing the whole output image DOUT displayed as display image DD. This results in low operability.

Figure 25:
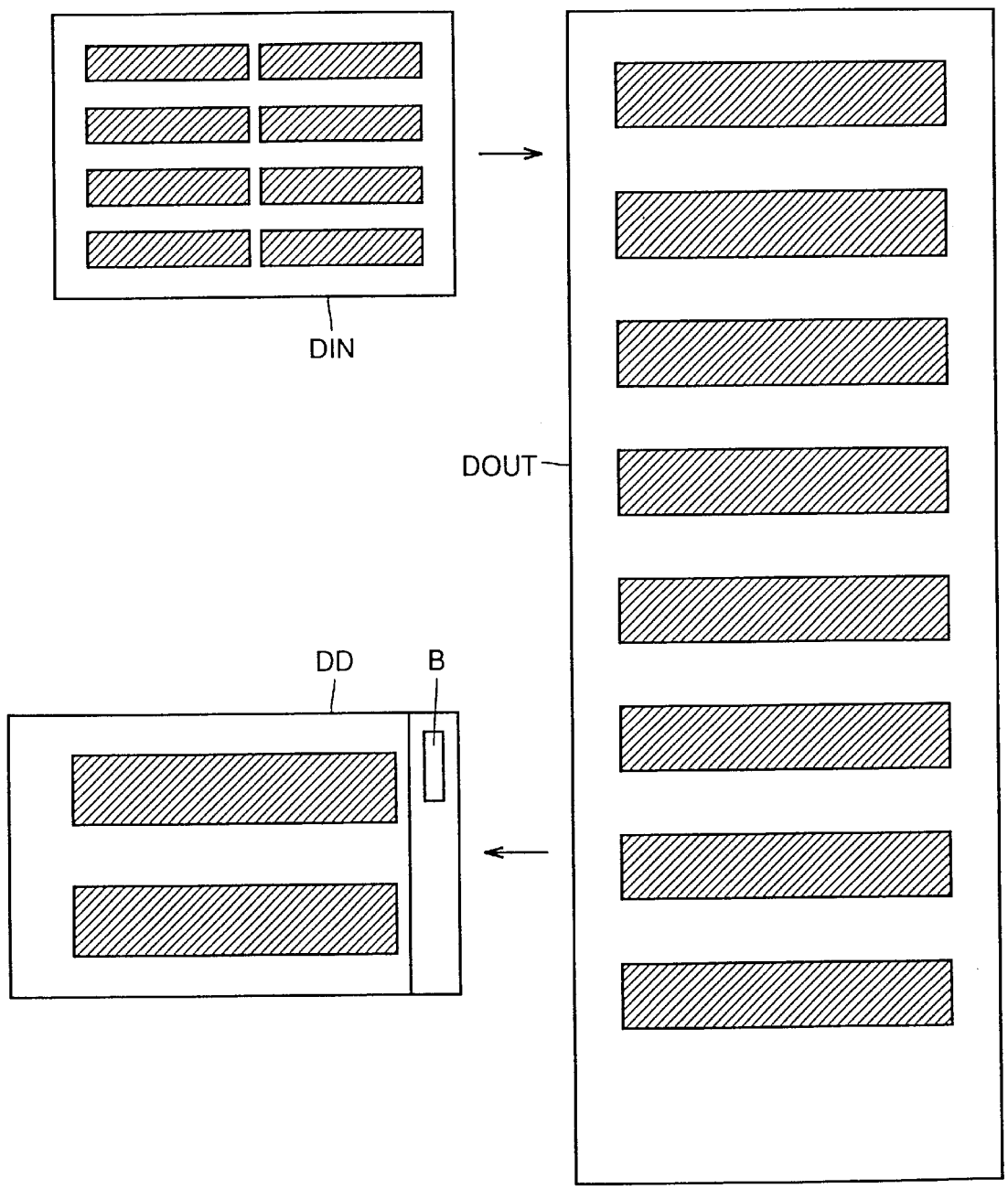
FIG. 25 shows a relationship between an input image and an output image produced by the image display device according to the first embodiment.

In contrast to the above, input image DIN, output image DOUT and displayed image DD according to the invention are configured as shown in FIG. 25. In this example, the division number of the line region is equal to 2, and input image DIN is enlarged by ((division number)×2) for obtaining output image DOUT. Therefore, the arrangement calculation can be simple. Further, the horizontal width of the output image is set equal to the horizontal width of the input image, and the vertical width of the output image is enlarged. Thus, the output image has the size of 100×400. Therefore, the user can view output image DOUT (i.e., can read the text) only by vertically dragging scroll bar B, resulting in improved operability. The vertical width of the output image may be set equal to the vertical width of the input image, and the horizontal width of the output image may be increased, in which case the user can read the text only by horizontal scrolling, which likewise improves the operability.

FIG. 25 shows the case where the output image is accommodated in one page. However, if the input and output images have the same horizontal size, the output image cannot have a sufficient vertical length. Therefore, the output image must contain multiple pages. As described above, the input, output and displayed images are configured to have the same size, and the output image is formed of the multiple pages, whereby the user can turn to an intended page only by touching a button for page turning. This can improve the operability, compared with operation requiring the scrolling. For providing the output image formed of pages equal to an integer in number, the vertical or horizontal size of the input image may be equal to an integral multiple of the vertical or horizontal size of the output image. This is desirable from the viewpoint of the page turning operation.

It is assumed that the input image has the size of 100×100 and the zoom rate of ½. It is also assumed that the output image has the size of 100×100. In this case, if the input image is simply enlarged by ½, it has the size of 50×50. Since the output image has a size of 100×100, one output image can be formed of four input images. For providing the output image formed of an integral number of pages, the vertical or horizontal size of the input image is desirably of the vertical or horizontal size of the output image divided by a whole number from the viewpoint of the page turning operation. In this case, rearrangement of the divided line regions is not required, and the processing can be simple.

Figure 26:
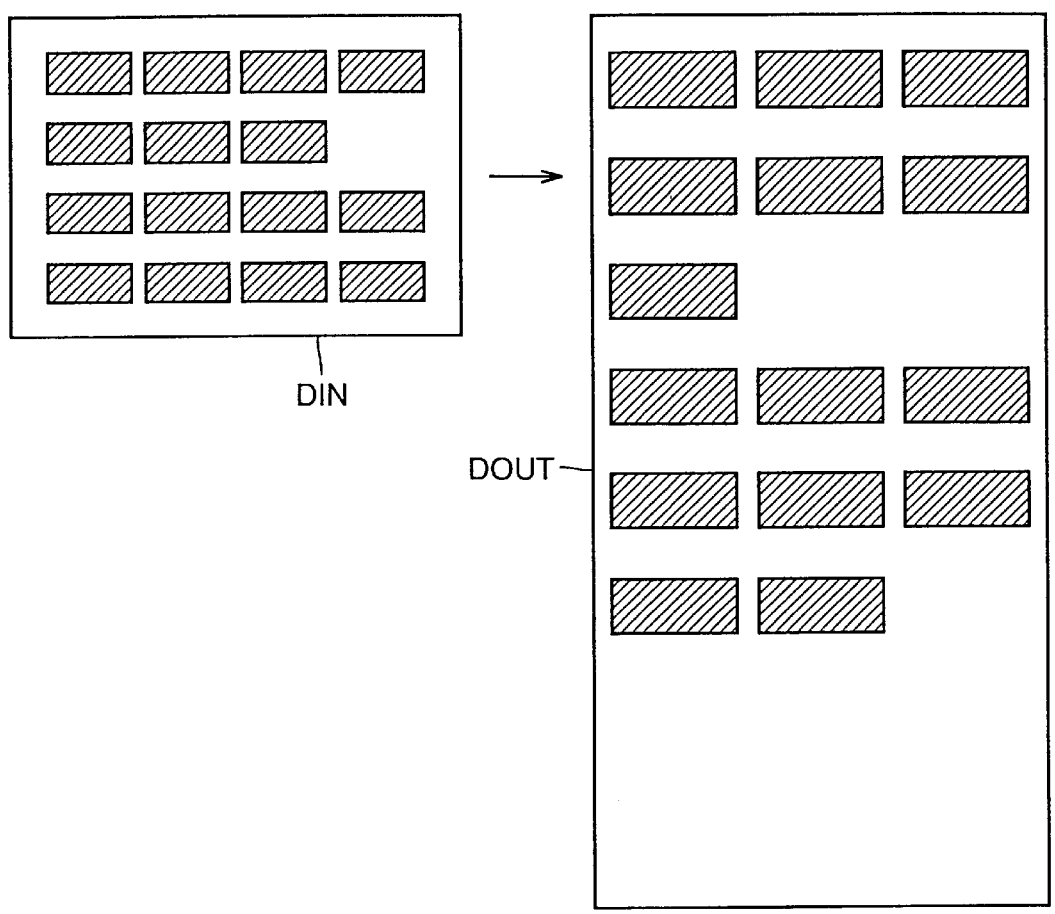
FIG. 26 shows by way of example column arranging processing.

Referring to FIG. 26, description will be given on an example of newline keeping in the composition processing. In FIG. 26, the line region is divided into four, and the divided line region is enlarged by 1.5. The newline in the second line of input image DIN is held on output image DOUT.

Figure 27:
FIG. 27 shows by way of example an input image having a background pattern.
Figure 28:
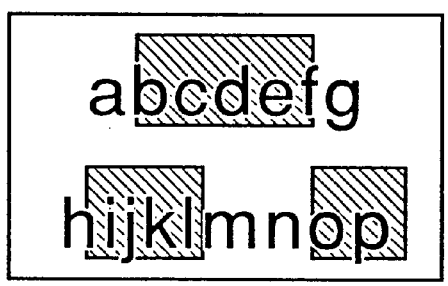
FIG. 28 shows by way of example an output image produced by enlarging the input image having the background pattern by two times.
Figure 29:
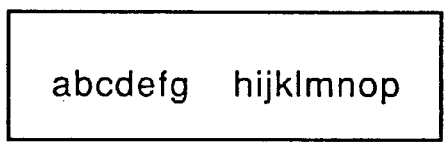
FIG. 29 shows by way of example the input image from which the background pattern is removed.
Figure 30:
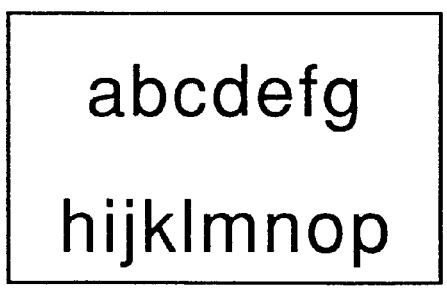
FIG. 30 shows by way of example an output image produced by enlarging by two times the input image, from which the background pattern is removed.

Referring to FIGS. 27–30, description will now be given on the case where a background is removed from the input image. For example, as shown in FIG. 27, a background pattern formed of thin oblique stripes is present in a portion of the input image, and characters are written in black over the background. By enlarging this input image by two times, the output image shown in FIG. 28 is formed. In this case, such a problem occurs in line division during formation of the output image or in continuity of the background patter. For overcoming this problem, the input image which is subjected in advance to background removing processing is used instead of the input image, which is not subjected in advance to processing. The removal of the background pattern can be simply performed based on the assumption that the background patterns have a lower density than characters and others. First, a binary threshold is obtained from the input image. This may be a value obtained by a discriminant analysis method, or may be a fixed value. In the simplest manner, all the pixels not exceeding this threshold are set to the background density (e.g., white). Thereby, the background patterns of low densities are removed, and the input image shown in FIG. 29 is obtained. An output image shown in FIG. 30 is obtained from the image in FIG. 29. The background removal may be performed by divided line region extracting portion 2.

As already described, the image display device according to this embodiment performs the zooming in units each formed of the divided line region of the line region in the input image. Therefore, the document can be zoomed without disturbing the sequence of the characters in the input image. Accordingly, by appropriately determining the length of one side of the output image, the user can read the document by dragging the scroll bar in only one direction. Since the rearrangement is performed in units each formed of the divided line region, the amount of information displayed on each output image can be larger than that in the case where the input image is simply zoomed.

Second Embodiment

A second embodiment described below relates to a case where an input image contains a picture/photograph region.

Figure 31:
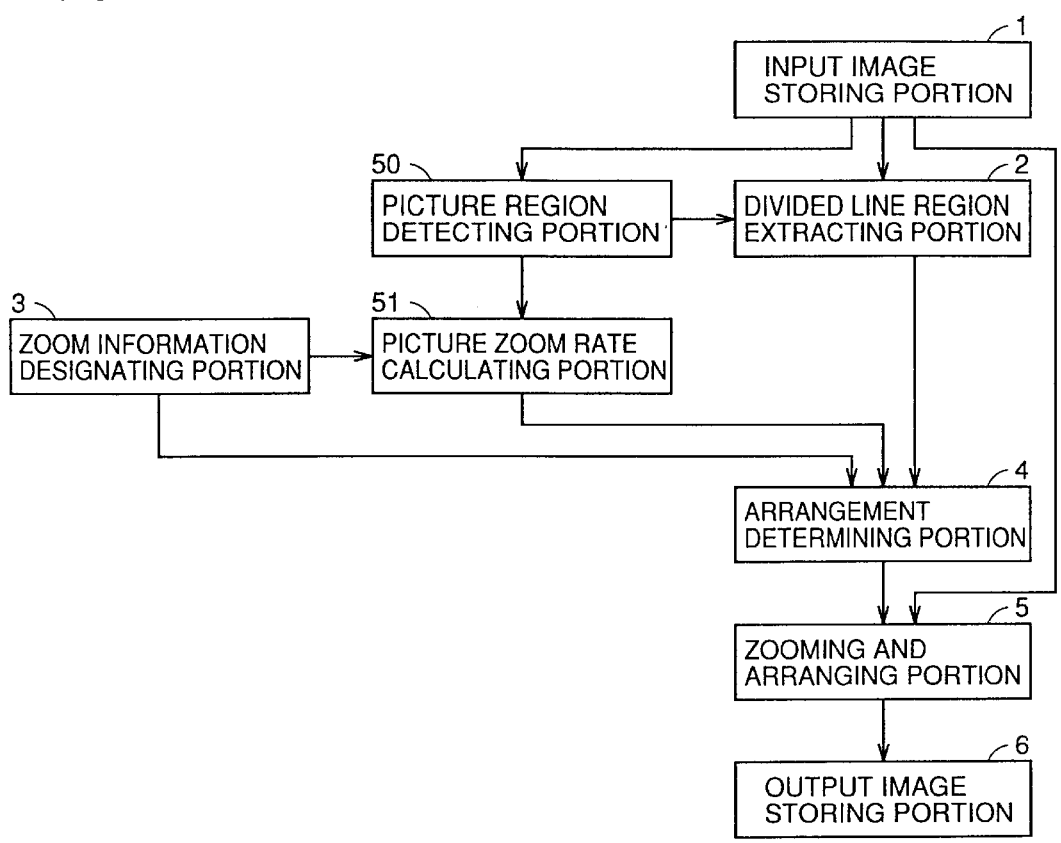
FIG. 31 is a block diagram showing a major structure of an image display device according to a second embodiment.

Referring to FIG. 31, an image display device according to this embodiment includes a picture region detecting portion 50 and a picture zoom rate calculating portion 51 in addition to the structure of the image display device of the first embodiment. Picture region detecting portion 50 is connected to input image storing portion 1 for detecting a picture region and a photograph region (which will be referred to as "picture/photograph regions", hereinafter). Picture zoom rate calculating portion 51 is connected to zoom information designating portion 3 and picture region detecting portion 50, and obtains the size of the designated output image and the zoom rate to determine the zoom rate at which the picture/photograph region detected in picture region detecting portion 50 can be enlarged or reduced without exceeding in size the output image.

For easy handling in arrangement determining portion 4, divided line region extracting portion 2 handles the picture/photograph region as the divided line region, and stores the information thereof in the storage region shown in FIG. 13 similarly to the information of the divided line region corresponding to the characters.

Other components are the same as those of the image display device shown in FIG. 1, and therefore detailed description thereof is not repeated herein.

Figure 32:
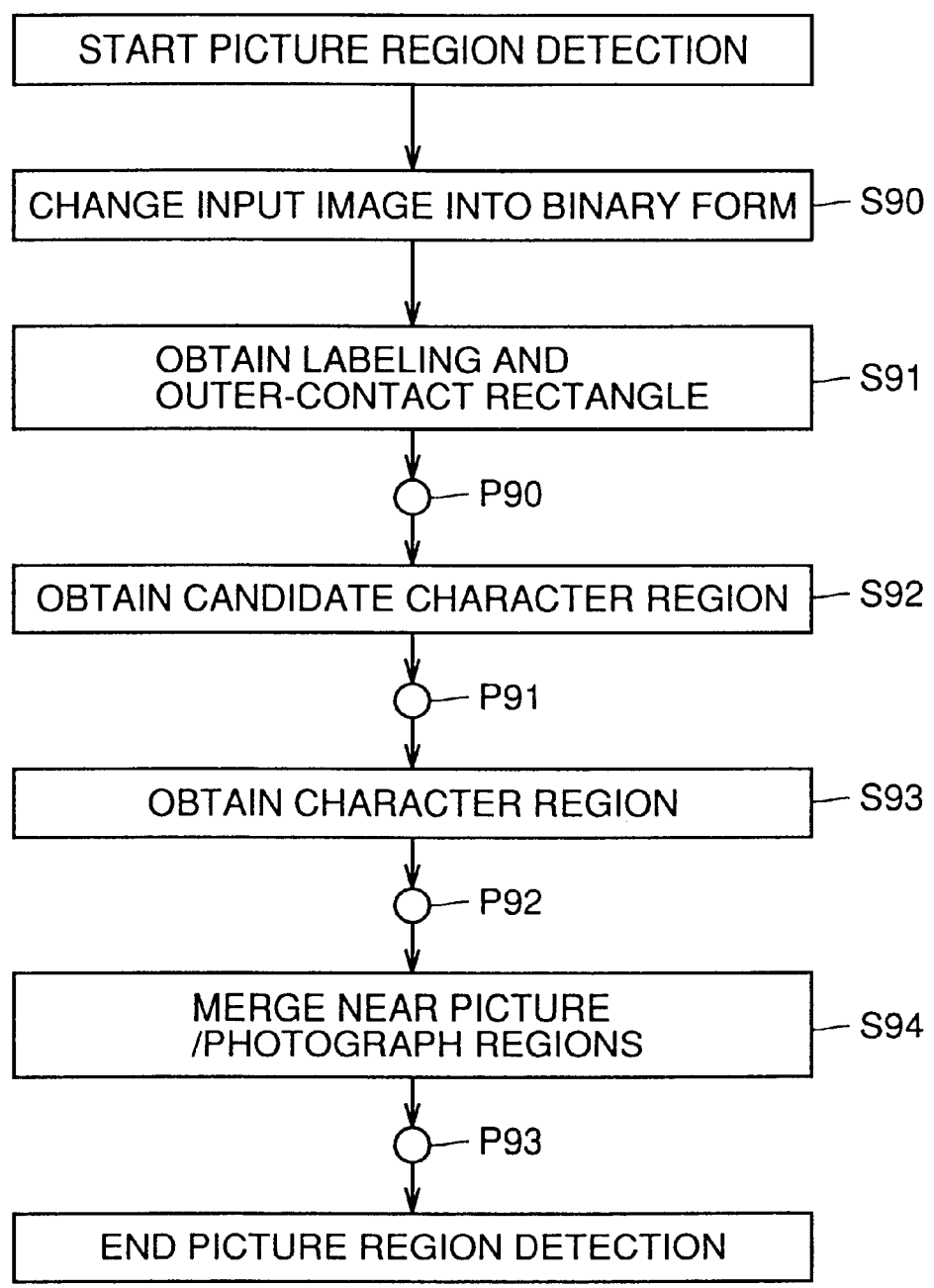
FIG. 32 is a flowchart showing an operation of a picture region detecting portion 50.

Referring to FIG. 32, description will now be given on the operation of picture region detecting portion 50. The processing of detecting the picture/photograph region is so-called image region separating processing. This can be performed by various manners already proposed, and an example thereof will now be described.

Picture region detecting portion 50 changes the input image to a binary form (step S90). The threshold for change into the binary form may be obtained by the discriminant analysis method, or may be a fixed value in some cases depending on the output images. Picture region detecting portion 50 performs the labeling processing on the image in the binary form for obtaining the outer-contact rectangles of each labeled region, and merges the rectangles neighboring to each other (step S91). The processing in step S91 is performed similarly to the processing performed by divided line region extracting portion 2.

Picture region detecting portion 50 selects the candidate character regions from all the outer-contact rectangles (step S92). Picture region detecting portion 50 selects the character region from all the candidate character regions (step S93). Since the character region is extracted from the candidate character regions, the picture/photograph regions can be defined. In connection with this, the determination can be performed on the basis that all the regions other than the character region are to be handled as the picture/photograph region, or on the basis that the character region is to be handled as the picture/photograph region if it is not the candidate character region. If the character regions other than the candidate character regions are to be handled as the picture/photograph regions, the processing in step S93 is not required.

Picture region detecting portion 50 merges the neighboring picture/photograph regions together (step S94), and ends the processing. The information of the picture/photograph region is stored as information for one line in a structure similar to that shown in FIG. 13.

Figure 33:
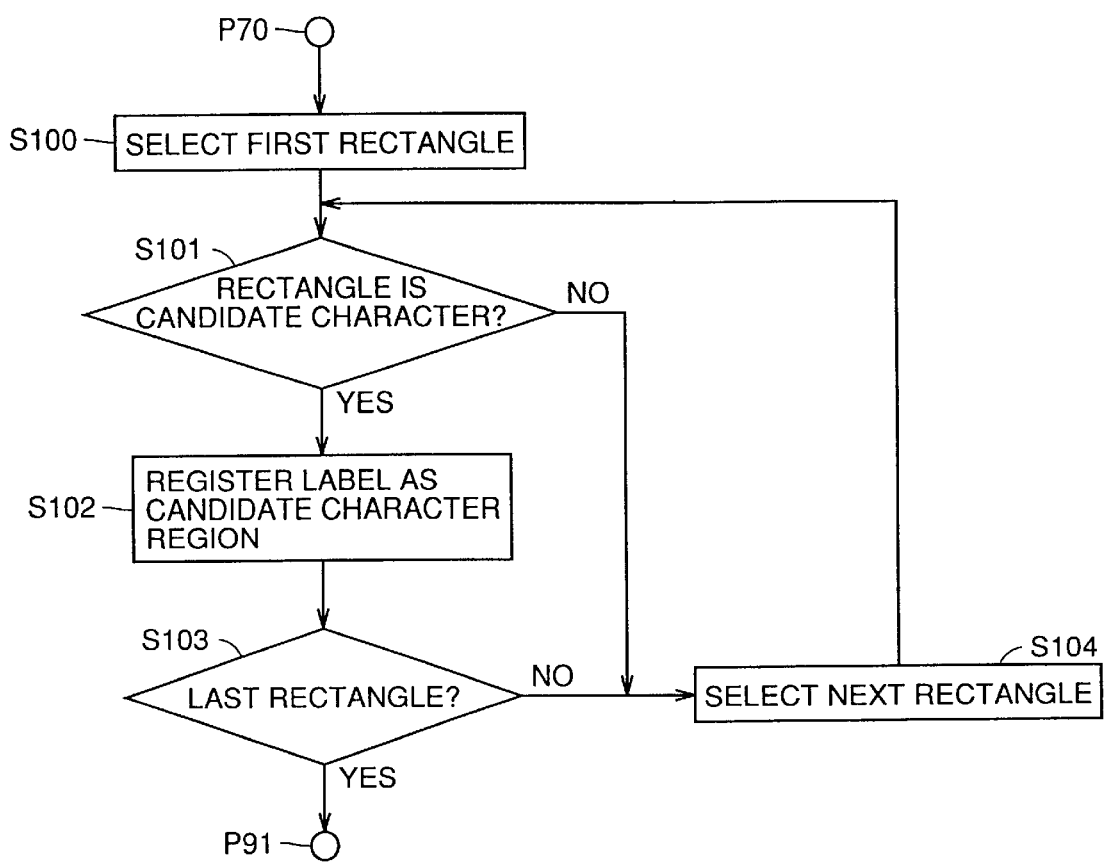
FIGS. 33, 34 and 35 are flowcharts specifically showing processing in steps S92, S93 and S94 in FIG. 32, respectively.

Referring to FIG. 33, processing in step S92 shown in FIG. 32 will now be described in greater detail. Picture region detecting portion 50 selects the first outer-contact rectangular region (step S100). Thus, it sets an outer-contact rectangle index q0, which represents the number of outer-contact rectangle information obtained in step S91, to 0.

Picture region detecting portion 50 determines whether the rectangle region (i.e., rectangle region q0) corresponding-to outer-contact rectangle index q0 is probably a character or not, based on a size (W6, H6) of rectangular region q0 as well as its aspect ratio. It is determined that rectangular region is probably a character when the all the three formulas described below are satisfied.

$Tw\ min < W\ 6 < Twmax$ $Th\ min < H\ 6 < Thmax$ $Tr\ min < W\ 6 / H\ 6 < Tr\ max.$ Here, Twmin, Twmax, Thmin, Thmax, Trmin and Trmax are thresholds, respectively. When it is determined that the rectangular region is not probably a character (NO in step S101), the value of outer-contact rectangle index q0 is increased by one (step S104), and the processing in and after step S101 is repeated.

When it is determined that the rectangular region is probably a character (YES in step S101), the labeling value in the outer-contact rectangle information is set to −1 for distinguishing rectangular region q0 as a candidate character region (step S102). Picture region detecting portion 50 determines whether a series of processing is effected on all the rectangular regions (step S103). This determination is performed by comparing the number labeling number) of the outer-contact rectangles at the leading end of the information storage region with (q0+1). When the result of comparison exhibits matching, it is determined that the processing on all the rectangular regions is completed.

When there is an unprocessed rectangular region (NO in step S103), the value of outer-contact rectangle index q0 is increased by one (step S104), and the processing in and after step S101 is repeated. If all the rectangular regions are already processed (YES in step S103), the processing moves via a connector P91 to step S93.

Figure 34:
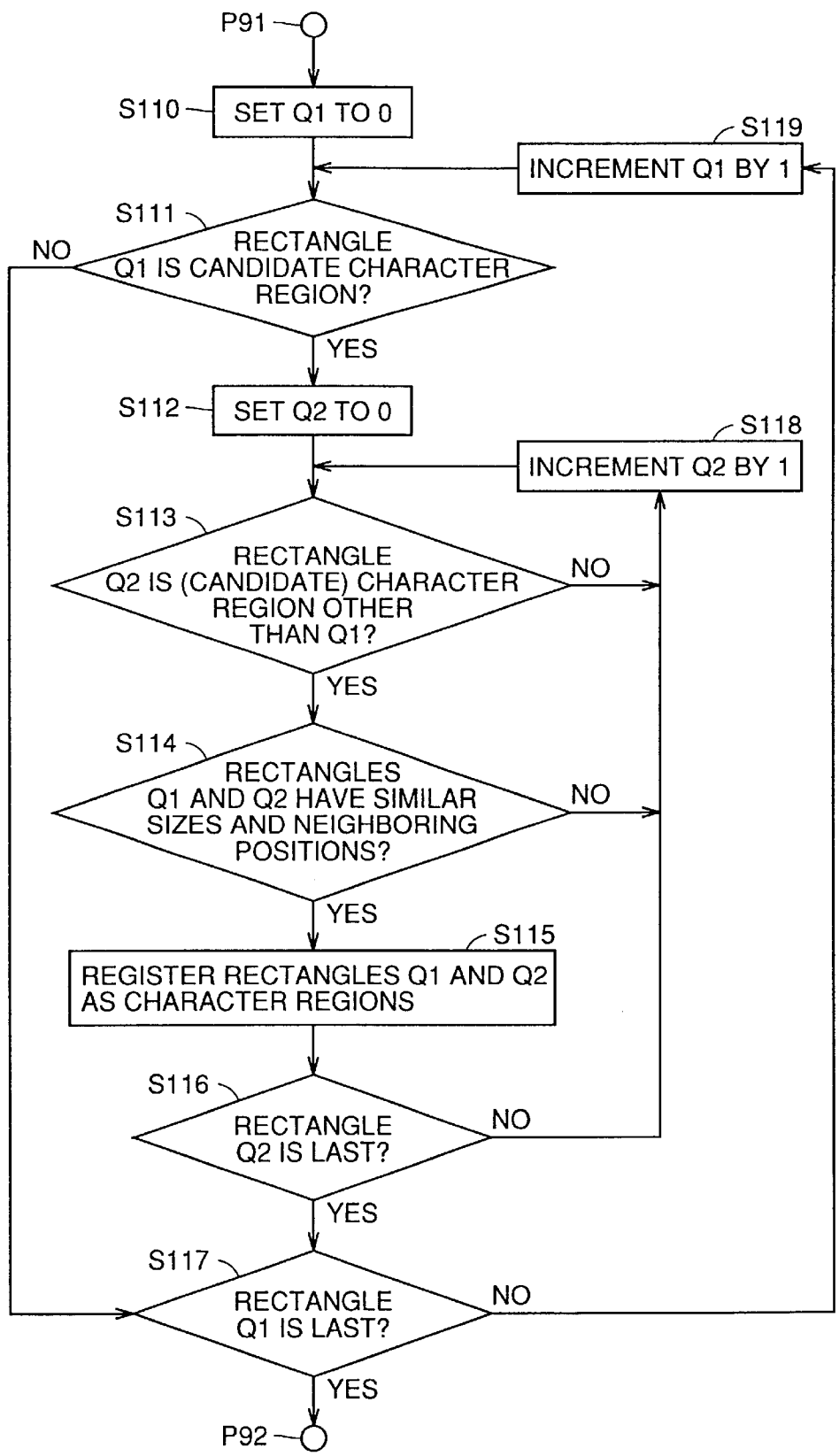

Referring to FIG. 34, description will now be given on step S93 in FIG. 32 in greater detail. Picture region detecting portion 50 sets an outer-contact rectangle index q1 to 0 (step S110). Picture region detecting portion 50 determines whether a rectangular region (which will be referred to as a "rectangular region q1", hereinafter) corresponding to outer-contact rectangle index q1 is the candidate character region or not (step S111). The determination of whether the rectangular region is the candidate character region or not is performed by determining whether the labeling value of the rectangular region is equal to −1 or not.

If the rectangular region is the candidate character region (YES in step S111), the processing moves to a step S112. If it is not the candidate character region (NO in step S111), the processing moves to a step S117.

In step S112, picture region detecting portion 50 sets an outer-contact rectangle index q2 to 0. Picture region detecting portion 50 determines whether a rectangular region (which will be referred to as a "rectangular region q2", hereinafter) corresponding to an outer-contact rectangle index q2 is a candidate character region or not, and whether a relationship of q1≠q2 is present or not (step S113). If it is the character region, the labeling value is set to −2 by the processing, which will be described later. Therefore, determination of whether it is the rectangular region or not can be performed by determining whether the labeling value is equal to −2 or not.

When the conditions in step S113 are not satisfied (NO in step S113), outer-contact rectangle index q2 is increased by one (step S118), and the processing after step S113 is repeated.

If the conditions in step S113 are satisfied (YES in step S113), picture region detecting portion 50 determines whether rectangular regions q1 and q2 have similar sizes and neighbor with each other, or not (step S114). Determination of whether these regions neighbor with each other or not can be determined by determining whether the distance between them exceeds a threshold Tt or not. The definition of the distance between the rectangles may be the same as that in the merging processing. Determination of whether these distances are equal to each other or not can be performed by determining whether the following two formulas are both satisfied or not, assuming that rectangular region q1 has a size of (W7, H7), and rectangular region q2 has a size of (W8, H8).

$$abs(W7/W8-1)<Twt$$

$$abs(H7/H8-1<Tht$$

where Twt and Tht are thresholds.

If rectangular regions q1 and q2 have different sizes and/or do not neighbor with each other (NO in S114), the processing moves to a step S118. If rectangular regions q1 and q2 have equal sizes and neighbor with each other (YES in step S114), picture region detecting portion 50 determines that both rectangular regions q1 and q2 are character regions, and sets the value of labeling in the outer-contact rectangle information to −2 representing a character region (step S115).

Picture region detecting portion 50 determines whether the processing is already effected on all rectangular regions Q2 or not (step S116). This determination is performed by comparing the number (labeling number) of outer-contact rectangles at the leading end of the information storage region with (q2+1), and determining that the processing is already performed on all rectangular regions q2 when it is equal to (q2+1). If the processing is not yet performed on all rectangular regions q2 (NO in step S116), processing moves to step S118.

If the processing is already performed on all rectangular regions q2 (YES in step S116), it is determined whether the processing is already performed on all rectangular regions q1 or not (step S117). This is performed by comparing the number (labeling number) of outer-contact rectangles at the leading end of the information storage region with (q1+1), and determining that the processing is already performed on all rectangular regions q1 when it is equal to (q1+1). If unprocessed rectangular region q1 is present (NO in step S117), the value of outer-contact rectangle index q1 is increased by one (step S119), and processing in and after step S111 is repeated.

If the processing on all rectangular regions q1 is already completed (YES in S117), the processing moves to step S94 via a connector P92.

Figure 35:
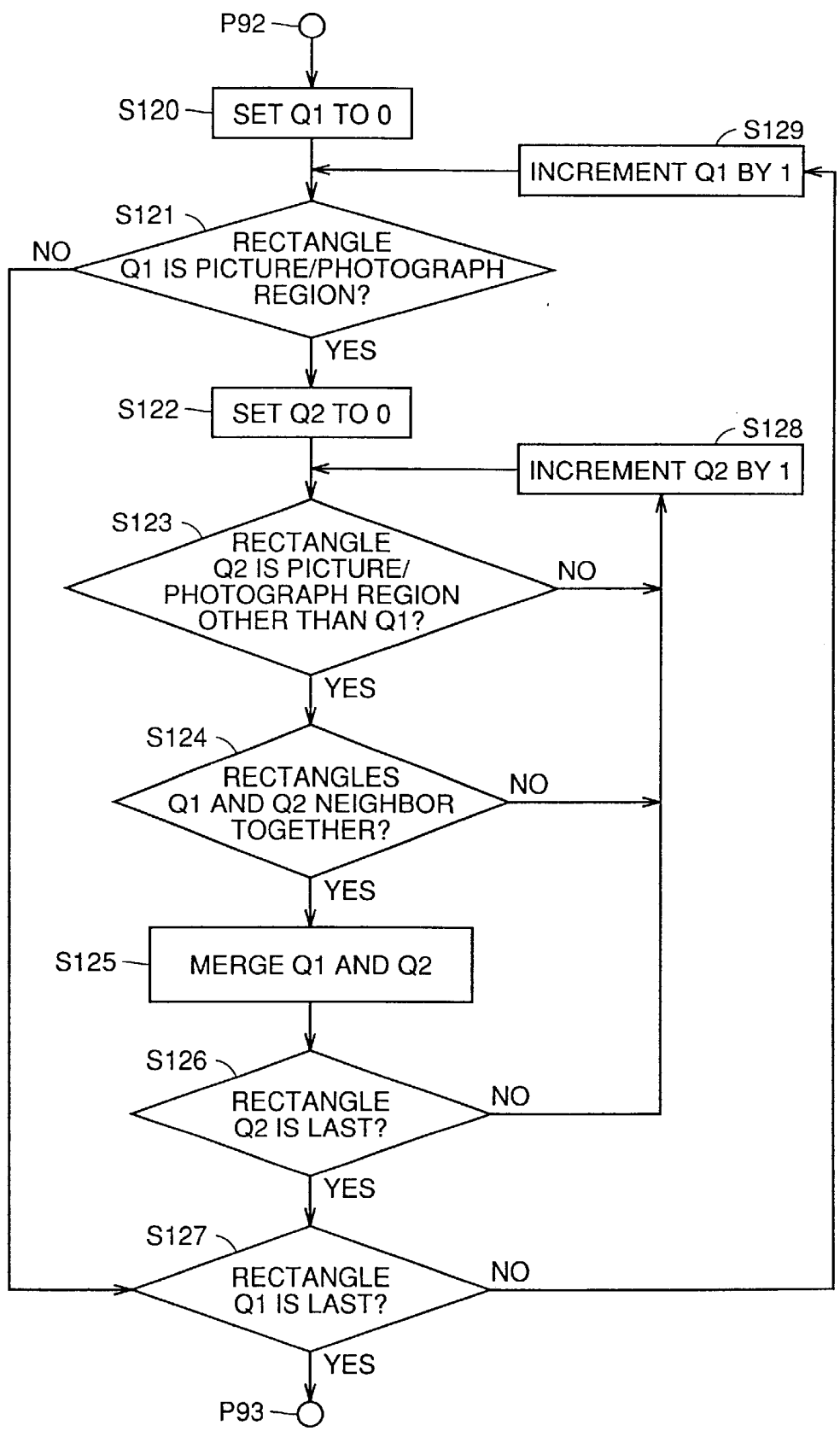

Referring to FIG. 35, specific description will now be given on processing in step S94 shown in FIG. 32. The definition of the picture/photograph region are the same as that already described in connection with the processing in step S93. If region other than the character region is defined as the picture/photograph region, the region of the labeling value other than −2 is the picture/photograph region. If even the character region other than the candidate character region is defined as the picture/photograph region, the region of the labeling value of −2 or −1 is the picture/photograph region.

Picture region detecting portion 50 sets outer-contact rectangle index q1 to 0 (step S120). Picture region detecting portion 50 determines whether rectangular region q1 is a picture/photograph region or not (step S121). If rectangular region q1 is the picture/photograph region (YES in step S121), processing moves to a step S122. If not (NO in step S121), the processing moves to a step S127.

In step S122, picture region detecting portion 50 sets outer-contact rectangle index q2 to 0. Picture region detecting portion 50 determines whether rectangular region q2 is a picture/photograph region and a relationship of q1≠q2 is present, or not (step S123).

If the conditions in step S123 are not satisfied (NO in step S123), outer-contact rectangle index q2 is increased by one (step S128), and the processing in and after step S123 is repeated.

When the conditions in step S123 are satisfied (YES in step S123), picture region detecting portion 50 determines whether rectangular regions q1 and q2 neighbor with each other, or not (step S124). This determination can be performed by determining whether the distance between rectangles q1 and q2 exceeds threshold Tp or not. The definition of the distance between the rectangles may be the same as that in the foregoing merging processing. If rectangular regions q1 and q2 do not neighbor with each other (NO in step S124), the processing moves to a step S128.

If rectangular regions q1 and q2 neighbor with each other (YES in step S124), rectangular regions q1 and q2 are merged together (step S125). The merging is performed in the following manner. An outer-contact rectangle of outer-contact rectangles q1 and q2 is obtained, and the position and size of the outer-contact rectangle thus obtained are registered as renewed information of outer-contact rectangle q1. For removing information of outer-contact rectangle q2, the rectangle information following the information of outer-contact rectangle q2 is successively shifted and copied. The number (labeling number) of outer-contact rectangles, which is stored at the leading position, is finally reduced by one.

Picture region detecting portion 50 determines whether the processing is already effected on all outer-contact rectangles q2 (step S126). This determination is performed by comparing the number (labeling number) of outer-contact rectangles at the leading end of the information storage region with (q2+1), and determining that the processing is already performed on all rectangular regions q2 when it is equal to (q2+1). If unprocessed rectangular region q2 is present (NO in step S126), processing moves to step S128.

If it is determined that the processing is already performed on all rectangular regions q2 (YES in step S126), or rectangular region q1 is not the picture/photograph region (NO in step S121), it is determined whether the processing is already performed on all rectangular regions q1 or not (step S127). This is performed by comparing the number (labeling number) of outer-contact rectangles at the leading end of the information storage region with (q1+1), and determining that the processing is already performed on all rectangular regions q1 when it is equal to (q1+1). If unprocessed rectangular region q1 is present (NO in step S127), the value of outer-contact rectangle index q1 is increased by one (step S129), and processing in and after step S121 is repeated.

If the processing on all rectangular regions q1 is completed (YES in S127), the processing moves via a connector P93 to the end of processing in picture region detecting portion 50.

Picture zoom rate calculating portion 51 in FIG. 31 will now be described in greater detail. Picture zoom rate calculating portion 51 obtains a zoom rate of a restricted value, which prevents the picture/photograph region detected in picture region detecting portion 50 from being zoomed to extend off the output image. The size and zoom rate of the designated output image can be obtained from zoom information designating portion 3. It is assumed that the output image has a size (Wo, Ho) as well as top, bottom, left and right margins (Mt, Mb, Ml and Mr), and the picture/photograph region has a size of (Wpic, Hpic). For zooming the input image to match with the full width of the output image, the zoom rate Rh in the horizontal direction and the zoom rate Rv in the vertical direction can be obtained by the following formulas:

$$Rh = Wpic/(Wo - Ml - Mr)$$

$$Rv = Hpic/(Ho - Mt - Mb).$$

It is assumed that zoom information designating portion 3 designates the zoom rate (Rx, Ry). If no problem occurs even when an aspect ratio changes from that of the original picture/photograph region, such relationships are determined that Rh=Rx if Rx<Rh, and Rv=Ry if Ry<Rv, and (Rh, Rv) is used as the zoom rate of the picture/photograph region. If the aspect ratio is to be equal to the original aspect ratio, the zoom rate is restricted through the following conditions.

$$Rm = Rv \text{ if } Rh > Rv, \text{ and otherwise } Rm = Rh \quad (1)$$

$$Ri = Ry \text{ if } Rx > Ry, \text{ and otherwise } Ri = Rx \quad (2)$$

If $Ri < Rn$, $Rn = Ri$, and $(Rn, Rn)$ is used as the zoom rate of the picture/photograph region. $\quad (3)$ Since the zoom rate thus obtained depends on the individual picture/photograph regions, it is necessary to store the zoom rate of value corresponding to each region information. The zoom rate is stored in addition to the individual region information shown in FIG. 13, i.e., the coordinate values of the upper left position of the rectangular region and the size thereof.

The zoom rate of picture/photograph region is sent to arrangement determining portion 4. The picture/photograph region is registered as the divided line region in divided line region extracting portion 2. Therefore, arrangement determining portion 4 arranges the divided line regions in the manner already described with reference to FIG. 14 and others. However, different zoom rates are used for the character region and the picture/photograph region, respectively. When using the zoom rate, therefore, arrangement determining portion 4 determines whether the divided line region to be arranged is the picture/photograph region or not, and uses the zoom rate obtained from picture zoom rate calculating portion 51 for arranging the region if the region is picture/photograph region. Determination of whether the region is the picture/photograph region or not is performed by comparing the position and size of the divided line region with those of picture/photograph region. If both the regions have the same position and size, the divided line region in question can be determined as the picture/photograph region.

Figure 36:
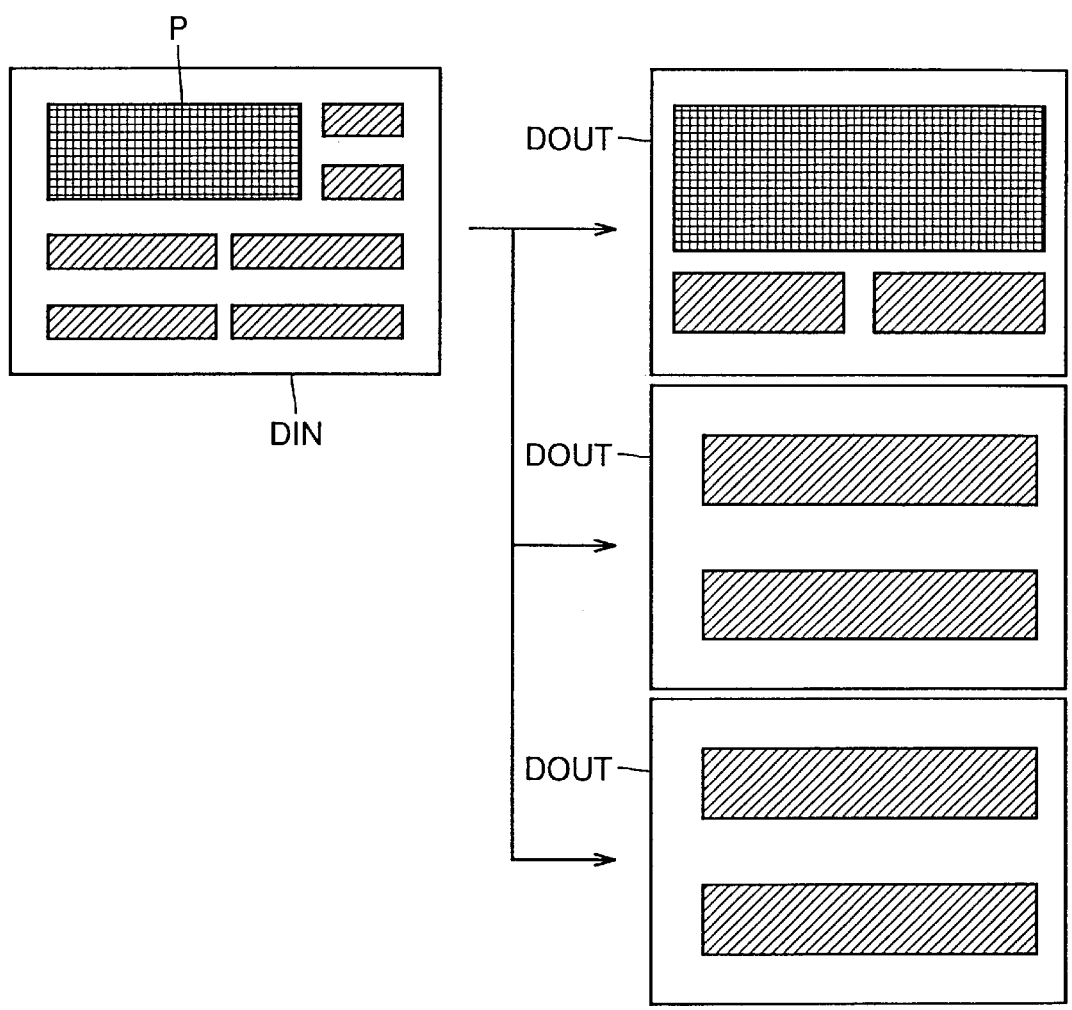
FIG. 36 shows a relationship between an input image and an output image produced by the image display device according to the second embodiment.

Referring to FIG. 36, a specific example of the foregoing processing will now be described. In FIG. 36, it is assumed that zoom information designating portion 3 designates the zoom rate of 2 for input image DIN. Each divided line region is twice enlarged. However, if picture/photograph region P were doubled, this would extend off output image DOUT (equal in size to the input image in this example). Therefore, the zoom rate is calculated such that the zoomed picture/photograph region does not extend off output image DOUT. As a result, picture/photograph region P is one and a half times enlarged. In many cases, it is preferable that the picture/photograph region can be entirely viewed at a glance. Therefore, it is desired to change the zoom rate of the character region.

According to this embodiment, the zoom rate of the picture/photograph region is determined such that the zoomed picture/photograph region does not extend off the output image. The zoom rate thus determined is different from that of the character portion. Therefore, the user can view and read the pictures, photographs and text, which are enlarged or reduced into appropriate sizes without extending off the screen.

Third Embodiment

Description will now be given on another embodiment, in which an input image includes a picture/photograph region.

Figure 37:
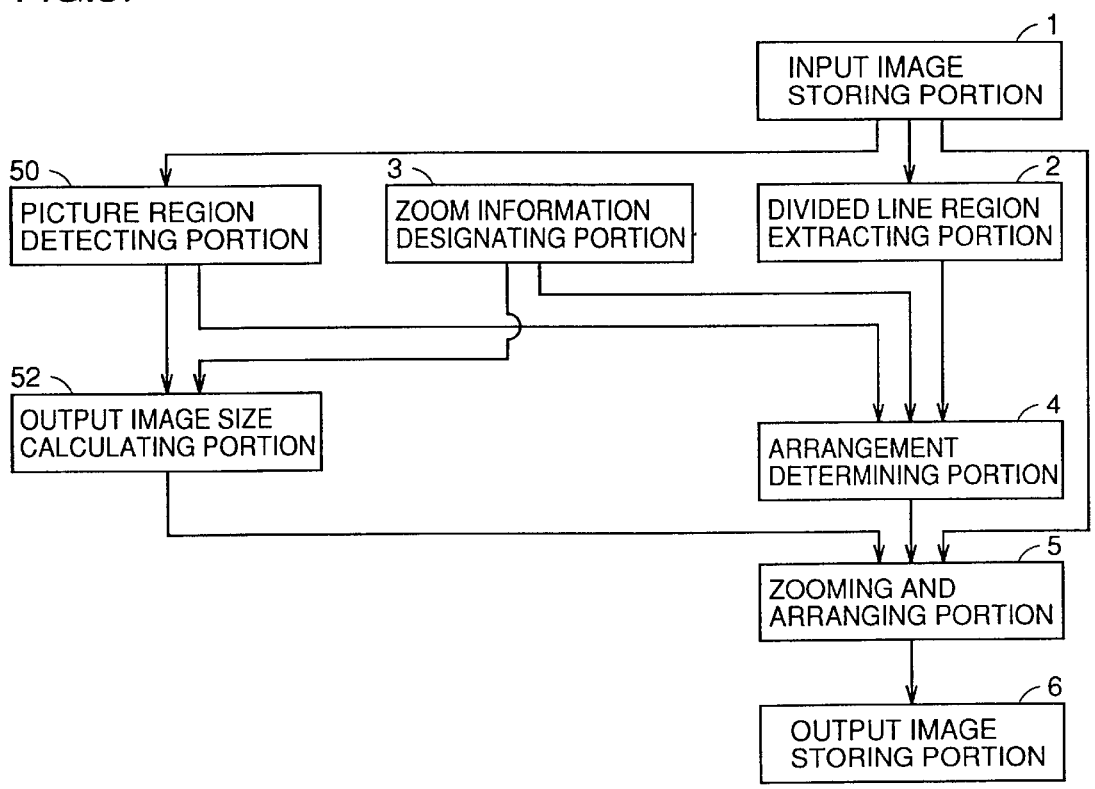
FIG. 37 is a block diagram showing a major portion of an image display device according to a third embodiment.

Referring to FIG. 37, an image display device according to this embodiment includes the same structure as the image display device according to the first embodiment, which is already described with reference to FIG. 1, and also includes picture region detecting portion 50 and an output image size calculating portion 52 added to the above structure.

Components other than the above are the substantially same as those of the image display device shown in FIG. 1. Therefore, detailed description thereof is not repeated here.

Picture region detecting portion 50 is connected to input image storing portion 1. Picture region detecting portion 50 is similar to that already described with reference to FIG. 31. Therefore, detailed description thereof is not repeated here.

Output image size calculating portion 52 is connected to picture region detecting portion 50, and compares the size of the picture/photograph region, which is obtained from picture region detecting portion 50 and is zoomed at the zoom rate obtained by zoom information designating portion 3, with the size (which will be referred to as an "old output image size", hereinafter) of the output image obtained from zoom information designating portion 3 for using the larger size between them as the new size (which will be referred to as a "new output image size", hereinafter) of the output image. The old output image size is sent to arrangement determining portion 4, and the new output image size is sent to zooming and arranging portion 5. Arrangement determining portion 4 performs the arrangement calculation of divided line regions using the old output image size. The arrangement calculation of the picture/photograph regions is performed basically similarly to that of the divided line regions of the characters. Even if the picture/photograph region arranged on the image of the old output image size extends off the image, it is left as it is. The output image stored in output image storing portion 6 is prepared with the new output image size. Therefore, even when the picture/photograph region was arranged on the image of the old output size, it does not extend off the output image when it is actually arranged by the zooming and arranging portion 5. Thus, the picture/photograph region is rearranged on the output image of the new output image size after being zoomed, and the character portions of the divided line regions are rearranged after being zoomed with the old output image size.

Figure 38:
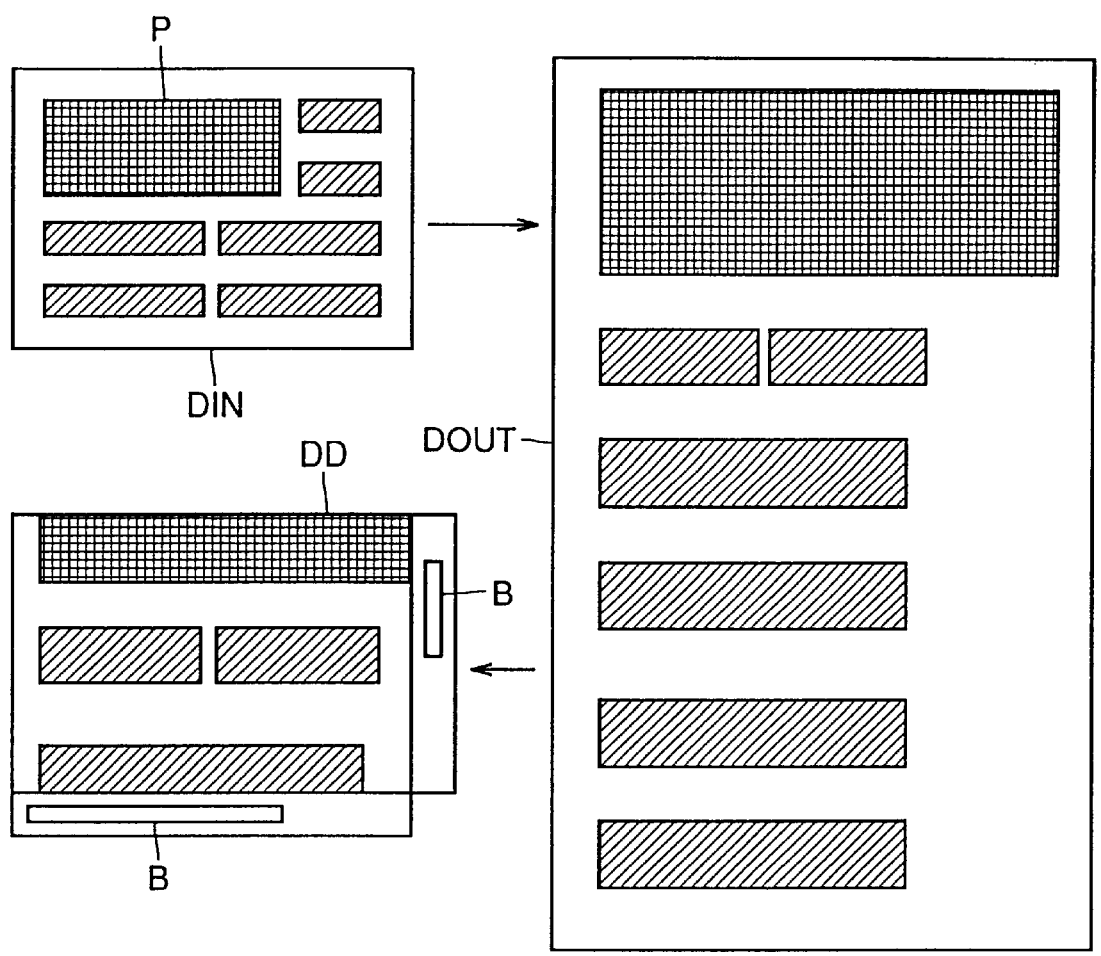
FIG. 38 shows a relationship between an input image and an output image produced by the image display device according to the third embodiment.

Referring to FIG. 38, a specific example of the foregoing processing will now be described. In FIG. 38, it is assumed that the zoom information designating portion 3 designates the zoom rate of 2 for the input image. In this case, each divided line region including picture/photograph region P is enlarged by two times. The picture/photograph regions are arranged without extending off the output image of the new output image size, and the divided line regions of the characters are arranged with the same width as the input image. For viewing the picture/photograph regions, therefore, the user must scroll the image in both the vertical and horizontal directions, but only the vertical scrolling is required for reading the text so that the user can read the text and can view the pictures with good operability.

Fourth Embodiment

In this embodiment, image data for a body region is processed independently of that for a peripheral region.

Figure 39:
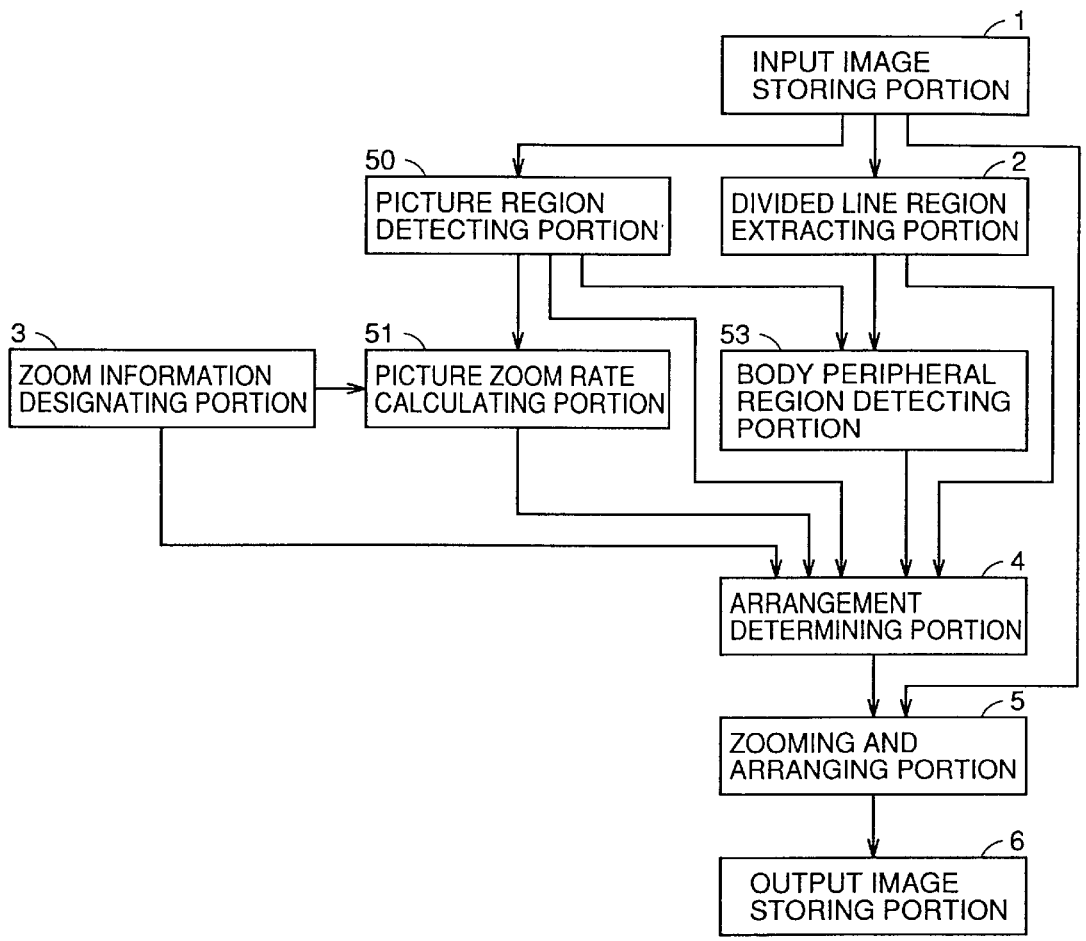
FIG. 39 is a block diagram showing a major structure of an image display device according to a fourth embodiment.

Referring to FIG. 39, an image display device according to this embodiment includes a body peripheral region detecting portion 53 in addition to the structure of the image display device according to the second embodiment already described.

Components other than the above are substantially the same as those of the image display device shown in FIG. 1 or 31. Therefore, detailed description thereof is not repeated here.

Body peripheral region detecting portion 53 is connected to divided line region extracting portion 2 and picture region detecting portion 50, and detects main body (main text) regions and peripheral regions from the information obtained from divided line region extracting portion 2 and picture region detecting portion 50. Thus, the divided line region or picture/photograph region located in the upper or lower end or the upper or lower corner in the input image is deemed as a page number or a chapter title, and is determined as a peripheral region.

For example, the divided line region or picture/photograph region, which is located within a range of 10% or less of a vertical size from the upper or lower end of the input image, is determined as the region located in the upper or lower end. The divided line region or picture/photograph region, which is further located within a range of 10% or less of a horizontal size from the right or left end of the input image, is determined as the peripheral region located in the upper or lower corner.

Only from one input image, it may be difficult to determine whether it is the peripheral region or not. Therefore, a plurality of input images may be processed wherein the result of processing of the last input image is recorded, and is compared with the result of processing of the input image, which is currently processed, for detecting the peripheral region. For example, the positions and sizes of the divided line regions and picture/photograph regions in the last input image are stored, and are compared with the positions and sizes of the divided line region and picture/photograph regions in the current input image. If certain regions do not substantially differ in position and size, and are located near the center of the input image, these can be determined as the peripheral regions. For example, the regions can be considered as the peripheral regions if a shift in position does not exceed Tp pixels, a difference in size does not exceed Tr3%, and the position is spaced from the periphery by Tr4% or less, where Tp, Tr3 and Tr4 are predetermined thresholds, respectively.

Information obtained in body peripheral region detecting portion 53 is sent to arrangement detecting portion 4. Arrangement detecting portion 4 arranges the peripheral region independently of the body region. Since the peripheral regions are page numbers, chapter titles and/or the like, these are arranged at constant relative positions in pages. It is assumed that a peripheral region having a size (W9, H9) is located in a position (X9, Y9), an input image has a size (Win, Hin), an output image has a size (Wo, Ho) and a zoom rate is equal to (Rx, Ry). In this case, an output position (X10, Y10) of the peripheral region is expressed by the following formula:

$$X10=(Wo-X9 \times Rx) \times (X9/(Win-W9))$$

$$Y10=(Ho-X9 \times Ry) \times (Y9/(Hin-H9)).$$

These are employed for preventing such a disadvantage that the page number or the like to be located in the peripheral region appears in an unexpected position due to zooming, which is performed without distinguishing the body region and the body peripheral region from each other.

Figure 40:
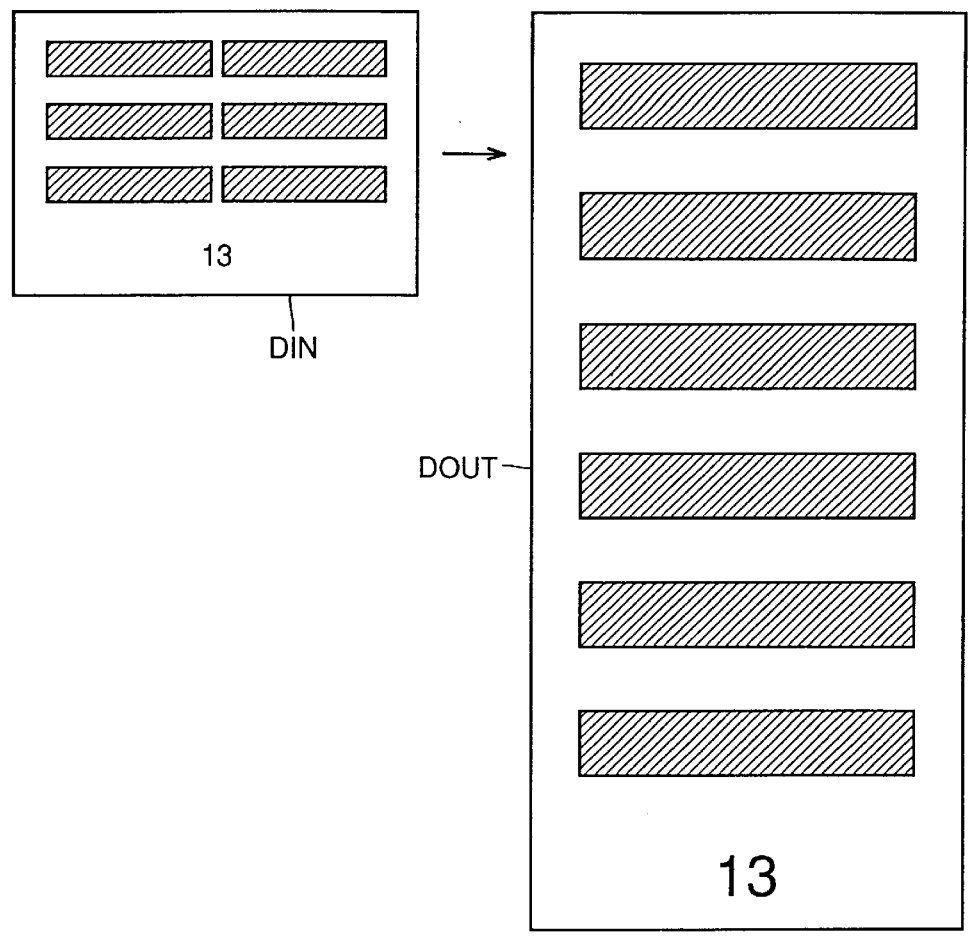
FIG. 40 shows a relationship between an input image and an output image obtained by the image display device according to the fourth embodiment.

Referring to FIG. 40, a specific example of the foregoing processing will now be described. In FIG. 40, it is assumed that zoom information designating portion 3 designates the zoom rate of 2 for the input image. Each line is divided into two each forming the body region, and the page number "13" is the peripheral region. The body regions are rearranged. The peripheral region is twice enlarged without changing the relative positional relationship with respect to the body regions. The peripheral region may be zoomed at a rate different from that of the body regions. Button 101 shown in FIG. 2 is originally provided for the user to press when the user wish to view the whole input image at a glance. In addition to this, button 101 can be used for switching to the input image when an error occurs in the line dividing processing or rearranging processing, and is to be corrected.

If a product of the size of the input image and the zoom rate is equal to a product of the size of the output image and a value obtained by dividing a small integer by a small integer, rearrangement calculation can be performed efficiently. A denominator of this fraction represents the number of divided line regions of a fixed width in a line on the output image, and a numerator represents the number of divided line regions of a fixed width in a line on the input image. The small integral number is employed instead of a mere integral because, if the number is large, the divided line regions of such a large number may not be formed in one line, and the smaller number of divided line regions allows more simple rearrangement calculation. The fixed width of the divided line region further simplifies the rearrangement calculation.

For example, the input and output images may have equal horizontal widths, and the zoom rate may be equal to 2, as shown in FIG. 40. In this case, the product of the size of input image and the zoom rate is equal to ½ of the size of output image. Therefore, the number of divided line region of the fixed width in a line on the output image is equal to 1, and the number of divided line regions of the fixed width in a line on the input image is equal to 2. Thus, the numbers of the divided line regions on the input and output images may be set to a value corresponding to the zoom rate expressed in a fractional form, whereby the rearrangement calculation can be simple.

Figure 41:
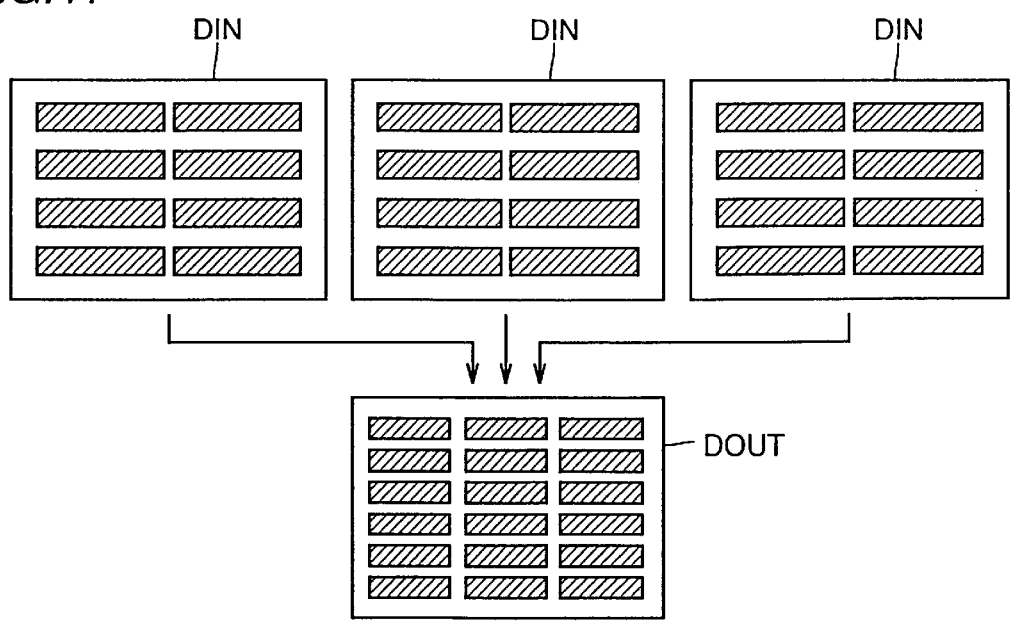
FIG. 41 shows an effect of simplifying calculation of rearrangement achieved by the fourth embodiment.

Referring to FIG. 41, when the input and output images have equal horizontal widths, and the zoom rate is ⅔, the product of the size of the input image and the zoom rate is equal to ⅔ of the size of the output image. Therefore, the number of divided line regions of the fixed width in a line on the output image is equal to 3, and the number of the divided line regions of the fixed width in a line on the input image is equal to 2. Therefore, two divided line regions of the fixed width can be set in a line on the input image, and three divided line regions can be rearranged in a line on the output image.

As described above, this embodiment can avoid such a disadvantage that the page number or the like is displayed in an unexpected position when the body region and the peripheral region are zoomed without distinguishing them.

Fifth Embodiment

According to the first to fourth embodiments, the image display device processes the input image on a page-by-page basis in principle. In contrast to this, an image display device according to this embodiment processes multiple pages of the input image at a time.

Figure 42:
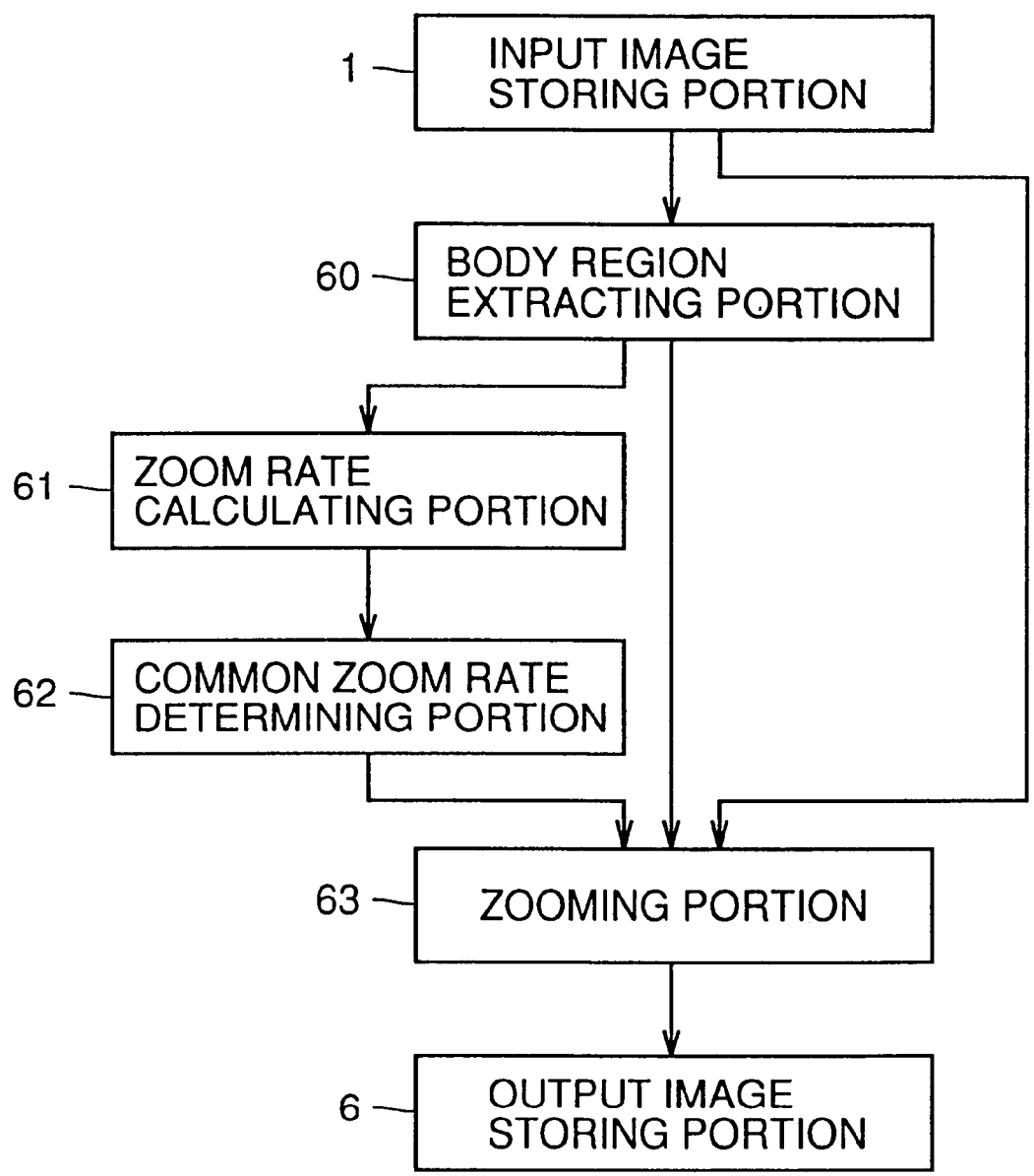
FIG. 42 is a block diagram showing a major structure of an image display device according to a fifth embodiment.

Referring to FIG. 42, the image display device according to this embodiment includes input image storing portion 1, a body region extracting portion 60 which is connected to input image storing portion 1 for extracting the body region in the input image, a zoom rate calculating portion 61 connected to body region extracting portion 60 for obtaining the zoom rate, at which the body region obtained from body region extracting portion 60 can have the same size as the input image, a common zoom rate determining portion 62 which is connected to body region extracting portion 60 and zoom rate calculating portion 61 for calculating a common zoom rate from the plurality of zoom rates of the input images sent from zoom rate calculating portion 61, a zooming portion 63 which is connected to body region extracting portion 60, common zoom rate determining portion 62 and input image storing portion 1 for zooming the body region obtained from body region extracting portion 60 at the common zoom rate obtained from common zoom rate determining portion 62, and sending it to the output image, and output image storing portion 6 connected to zooming portion 63 for storing the output image.

Input and output image storing portions 1 and 6 have functions similar to those in the image display device shown in FIG. 1. Therefore, detailed description thereof is not repeated here.

Body region extracting portion 60 extracts the peripheral regions, and selects the other regions as the body regions in a manner similar to that already described with reference to FIG. 39. However, the body region can be obtained by using only the line region without using the divided line region. Therefore, the processing of obtaining the divided line region may be eliminated. The body region is expressed as one rectangle, and is expressed by the upper left position and the size.

Zoom rate calculating portion 61 determines the zoom rate, with which the information of the body region obtained from body region extracting portion 60 in the foregoing manner may be equal in size to the input image. It is assumed that the input image has a size of (W10×H10), the position of the body region is expressed by (X11, Y11), and the body region has a size (W11, H11). In this case, horizontal zoom rate Rx and vertical zoom rate Rv are expressed by the following formulas:

$Rx = W11/W10$ $Ry = H11/H10.$

A smaller one between values of zoom rates Rx and Ry is selected as a zoom rate Ra. Zoom rate Ra thus obtained is supplied to common zoom rate determining portion 62.

Common zoom rate determining portion 62 obtains the common zoom rate by storing, in an array form, the zoom rates of the plurality of input images, which are issued from zoom rate calculating portion 61, and calculating the average value or the median thereof. For obtaining the average value or the median, the zoom rates of all the input images may be used, or the zoom rates of only several last input images may be used. Since first several images cannot provide a sufficient number of samples, the average value or the like may not be stable. In this case, a predetermined number of input images are processed to obtain the zoom rates so that the number of samples is increased, and thereafter the common zoom rate is obtained again by the calculation starting from the first image. This can provide the common zoom rate of a stable value. Common zoom rate determining portion 62 stores in an array form the upper left positions of the body regions obtained from body region extracting portion 60, and the average value or median of the upper left positions is obtained from each of the groups of the odd-numbered images and the even-numbered images. Thereby, the common upper left positions is obtained for each of the groups of the odd-numbered images and the even-numbered images. The stable common upper left positions can be obtained in a manner similar to that for obtaining the common zoom rate. The common zoom rate as well as the common upper left positions of the odd- and even-numbered images are sent to zooming portion 63.

Zooming portion 63 zooms the body region obtained by body region extracting portion 60 at the common zoom rate, which is obtained by common zoom rate determining portion 62 as described above, and writes the zoomed region as the output image into output image storing portion 6. If common zoom rate determining portion 62 obtains the common upper left positions of the odd- and even-numbered image groups, respectively, zooming portion 63 performs the zooming processing depending on the odd- and even-numbered images so that the common upper left position of the odd- or even-numbered image is located at the upper left end of the zoomed output image. The zooming processing can be achieved similarly to the processing in step S73 in FIG. 20. Therefore, description thereof is not repeated.

Figure 43:
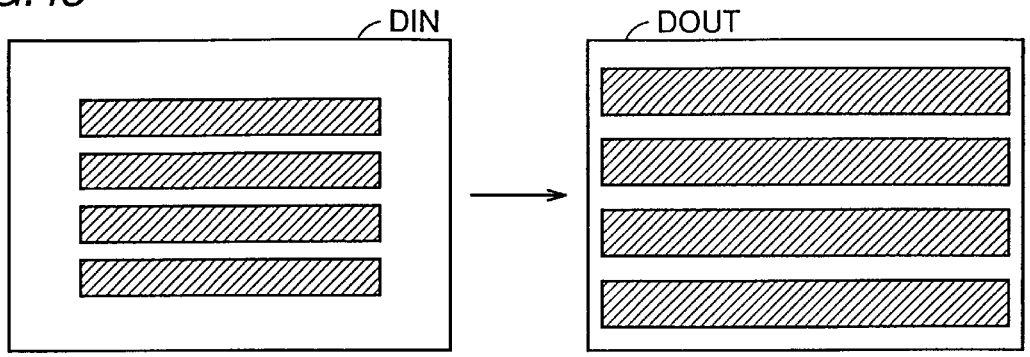
FIG. 43 shows a manner of enlarging a divided line region by 1.4 times.
Figure 44:
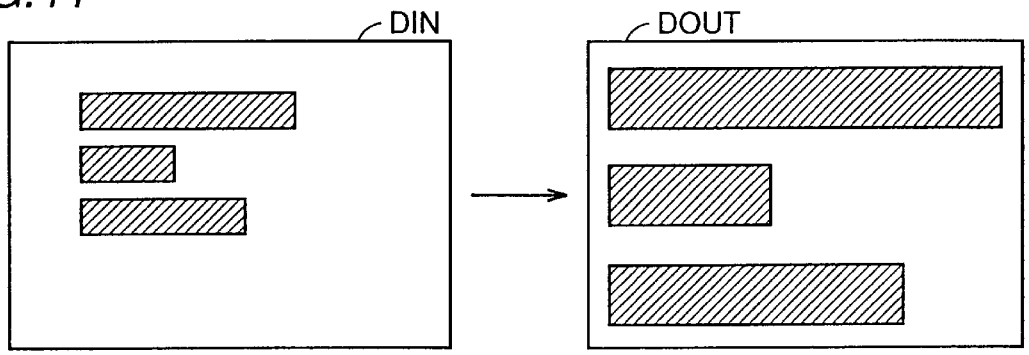
FIG. 44 shows a manner of enlarging the divided line region by 1.9 times.

Referring to FIGS. 43 to 46, description will now be given on an advantage achieved by using the common zoom rate. FIGS. 43 and 44 show the case, in which the body regions are output at different zoom rates to fill fully the output images. In FIG. 43, the divided line regions are 1.4 times enlarged and in FIG. 44, the divided line regions are 1.9 time enlarged. If the characters, which have substantially the same sizes in the input image, are enlarged into different sizes depending on the pages, the book will be very hard to read.

Figure 45:
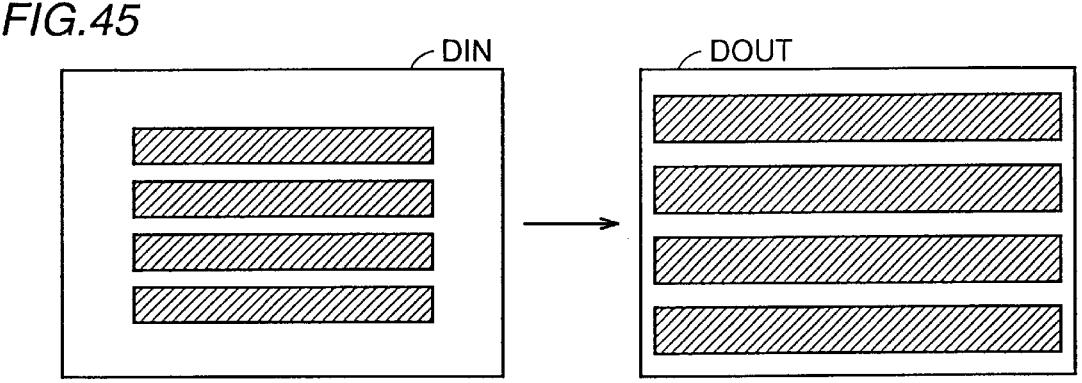
FIG. 45 shows a manner of zooming the divided line region shown in FIG. 43 at a zoom rate determined in the image display device according to the fifth embodiment.
Figure 46:
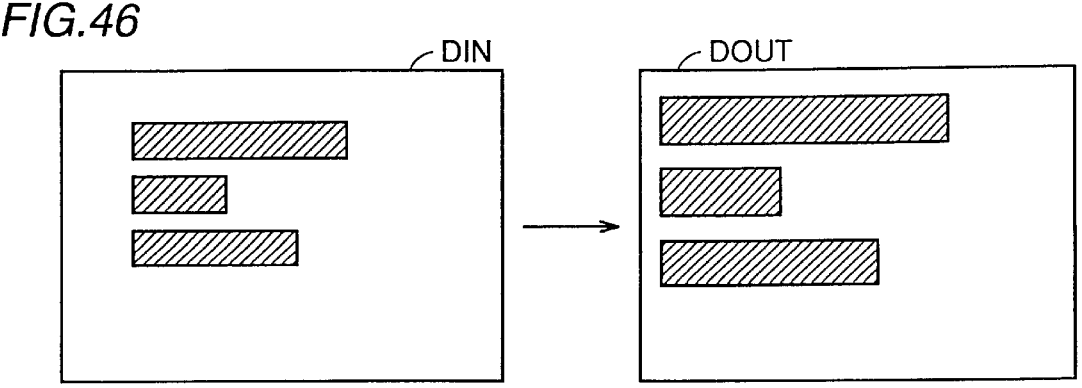
FIG. 46 shows a manner of zooming the divided line region shown in FIG. 44 at the zoom rate determined in the image display device according to the fifth embodiment.

By performing the foregoing processing, output images shown in FIGS. 45 and 46 are obtained, and the characters in the respective output images have the same size. Therefore, the user can read the book without a sense of discomfort.

In the above example, only the body region in the input image is zoomed and output to the output image for display. Instead of this manner, the whole input image may be zoomed at the determined zoom rate, and may be displayed as the output image, and the display may be performed with vertical and horizontal scroll bars arranged in such positions that locate the enlarged body region exactly within display screen 100. This can be achieved by mere zooming processing. Even if there is an error in the body region extracting processing, the error can be easily corrected by adjusting the scroll position and/or the zoom rate. In ordinary books formed of paper, page design is determined to achieve easy reading on a double-page spread. For example, in a horizontally openable book bearing vertical character lines, the size and vertical position of the body region in a left page are not substantially different from those in a right page, but a difference in horizontal position is present in many cases. In the case where the common upper left position for the odd-numbered pages and that for the even-numbered pages are obtained, a difference in horizontal position between the left and right pages can be dealt with, and it becomes unnecessary to adjust the scroll position every time the user turns the page. Button 101 in FIG. 2 is originally provided for switching when a user wish to view the whole input image at a glance. In addition to this, button 101 can be used for switching the input image, and thereby easily correcting an error, which may occur in the line dividing processing and/or rearranging processing.

Although the image display devices of the various embodiments have been described, such a configuration may be employed that, when the rearrangement of the divided line regions is not performed in an intended manner, the rearrangement may be stopped, an alarm alerting a user to this fact may be issued, or a hint for rearrangement may be given to the user. Smoothing may be effected on zoomed fonts of the characters.

According to this embodiment, the zoom rate common to the multiple input images is determined. Therefore, the sizes of the characters displayed on the different output images can be substantially uniform so that the user can read the document without a sense of discomfort.

The processing in the respective embodiments described above is executed by programs. The programs may be entirely or partly stored directly or via a communication line in a computer-readable record medium such as a flexible or hard disk, and may be installed in the computer when necessary.

Industrial Applicability

According to the image display device of the invention, as described above, the line region on the input image is zoomed in or out in units formed of the divided line regions. Therefore, the document can be zoomed without disturbing the sequence of characters in the input image. Accordingly, by appropriately determining the length of one side of the output image, the user can view the output image by moving the output image only in one direction, and therefore can appropriately view the zoomed image with good operability.

What is claimed is:

1. An image display device comprising:
a divided line region extracting portion for dividing a line region included in an input image in a line direction, and extracting a plurality of divided line regions; and
a processing portion connected to said divided line region extracting portion for zooming in or out, arranging and displaying said divided line regions at a predetermined zoom rate in units each formed of said extracted divided line region while keeping a sequence of arrangement,
wherein said processing portion prepares a new output image when said divided line region cannot be arranged within said output image of a predetermined size, and arranges said divided line region.

2. An image display device comprising:
a divided line region extracting portion for dividing a line region included in an input image in a line direction, and extracting a plurality of divided line regions; and
a processing portion connected to said divided line region extracting portion for zooming in or out, arranging and displaying said divided line regions at a predetermined zoom rate in units each formed of said extracted divided line region while keeping a sequence of arrangement,
wherein said processing portion arranges said divided line region such that a predetermined kind of character may not be located at the beginning of the line.

3. An image display device comprising:
a divided line region extracting portion for dividing a line region included in an input image in a line direction, and extracting a plurality of divided line regions; and
a processing portion connected to said divided line region extracting portion for zooming in or out, arranging and displaying said divided line regions at a predetermined zoom rate in units each formed of said extracted divided line region while keeping a sequence of arrangement,
wherein said processing portion keeps the position of return appearing on said input image on said output image.

4. An image display device comprising:
a divided line region extracting portion for dividing a line region included in an input image in a line direction, and extracting a plurality of divided line regions; and
a processing portion connected to said divided line region extracting portion for zooming in or out, arranging and displaying said divided line regions at a predetermined zoom rate in units each formed of said extracted divided line region while keeping a sequence of arrangement;
a picture region detecting portion for detecting a picture region and a photograph region in said input image; and
a picture zoom rate calculating portion connected to said picture region detecting portion for determining a new zoom rate in relation to said predetermined zoom rate for zooming said picture region and said photograph region detected by said picture region detecting portion so as to prevent increase in size over said output image, wherein
said divided line region extracting portion is connected to said picture region detecting portion for extracting as said divided line regions said picture region and said photograph region detected by said picture region detecting portion, and said processing portion includes:
- a picture zooming and displaying portion connected to said divided line region extracting portion and said picture zoom rate calculating portion for zooming in or out, and arranging said picture region and said photograph region based on said new zoom rate for display on said output image, and
- a character zooming and displaying portion connected to said divided line region extracting portion for zooming in or out, and arranging said divided line region other than said picture region and said photograph region based on said predetermined zoom rate for display on said output image.

5. An image display device comprising:

a divided line region extracting portion for dividing a line region included in an input image in a line direction, and extracting a plurality of divided line regions; and a processing portion connected to said divided line region extracting portion for zooming in or out, arranging and displaying said divided line regions at a predetermined zoom rate in units each formed of said extracted divided line region while keeping a sequence of arrangement;

a picture region detecting portion for detecting said picture region and said photograph region in said input image; and an output image size calculating portion connected to said picture region detecting portion for comparing a size of said picture region or said photograph region detected by said picture region detecting portion and zoomed in or out at said predetermined zoom rate with a size of said output image, and selecting the larger size as a new output image size, wherein said processing portion further includes:
- a picture zooming and displaying portion connected to said region detecting portion, said divided line region extracting portion and said output image size calculating portion for zooming in or out, and arranging said picture region and said photograph region based on said predetermined zoom rate for display in a position on the output image determined based on said new output image size, and
- a character zooming and displaying portion connected to said region detecting portion, said divided line region extracting portion and said output image size calculating portion for zooming in or out, and arranging said picture region and said photograph region based on said predetermined zoom rate for display in a position on the output image determined based on the original output image size.

6. An image display device comprising:

a divided line region extracting portion for dividing a line region included in an input image in a line direction, and extracting a plurality of divided line regions; and a processing portion connected to said divided line region extracting portion for zooming in or out, arranging and displaying said divided line regions at a predetermined zoom rate in units each formed of said extracted divided line region while keeping a sequence of arrangement;

a body peripheral region detecting portion connected to said divided line region extracting portion for detecting, as a body peripheral region, the divided line region located on an end of the input image among said divided line regions, wherein said processing portion is connected to said body peripheral portion detecting portion and said divided line region extracting portion for arranging and displaying said body peripheral region while keeping the same relative positional relationship as that on said input image.

7. An image display device comprising:

a divided line region extracting portion for dividing a line region included in an input image in a line direction, and extracting a plurality of divided line regions; and a processing portion connected to said divided line region extracting portion for zooming in or out, arranging and displaying said divided line regions at a predetermined zoom rate in units each formed of said extracted divided line region while keeping a sequence of arrangement; and a switch instructing portion for instructing switch of display between the input and output images.

8. An image display device comprising:

a body region extracting portion for extracting a body region other than an end of each of a plurality of input images;

a zoom rate calculating portion connected to said body region extracting portion for calculating a zoom rate for each of said plurality of input images such that the enlarged body region has the same size as said input image;

a common zoom rate determining portion connected to said zoom rate calculating portion for determining a common zoom rate based on the output of said zoom rate calculating portion; and a processing portion connected to said body region extracting portion and said common zoom rate determining portion for enlarging and displaying said body region of each of said plurality of input images at said common zoom rate.

9. The image display device according to claim 8, further comprising:

a switch instructing portion for instructing switch of display between the input and output images.

10. The image display device according to claim 8, wherein said common zoom rate determining portion is further connected to said body region extracting portion for determining a position common to the odd-numbered input image and a position common to the even-numbered image for locating the body regions of said input images obtained from said body region extracting portion, and said processing portion displays said body regions while zooming the common positions of said odd-numbered and even-numbered body regions obtained from said common zoom rate determining portion.

* * * * *

UNITED STATES PATENT AND TRADEMARK OFFICE
CERTIFICATE OF CORRECTION

PATENT NO. : 6,720,965 B2
DATED : April 13, 2004
INVENTOR(S) : M. Hirosawa et al.

It is certified that error appears in the above-identified patent and that said Letters Patent is hereby corrected as shown below:

Title page,
Item [30], Foreign Application Priority Data,
Please correct "Nov. 30, 1998 (JP)....................10/336654" to -- Nov. 30, 1998 (JP) ...................10/338654 --

Signed and Sealed this

Thirty-first Day of August, 2004

JON W. DUDAS
*Director of the United States Patent and Trademark Office*